United States Patent
Goodrich et al.

(10) Patent No.: US 11,232,646 B2
(45) Date of Patent: Jan. 25, 2022

(54) CONTEXT-BASED VIRTUAL OBJECT RENDERING

(71) Applicant: Snap Inc., Santa Monica, CA (US)

(72) Inventors: Kyle Goodrich, Venice, CA (US); Samuel Edward Hare, Los Angeles, CA (US); Maxim Maximov Lazarov, Culver City, CA (US); Tony Mathew, Los Angeles, CA (US); Andrew James McPhee, Culver City, CA (US); Daniel Moreno, Los Angeles, CA (US); Wentao Shang, Los Angeles, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 16/747,318

(22) Filed: Jan. 20, 2020

(65) Prior Publication Data
US 2021/0074074 A1 Mar. 11, 2021

Related U.S. Application Data

(60) Provisional application No. 62/897,001, filed on Sep. 6, 2019.

(51) Int. Cl.
*G06T 19/20* (2011.01)
*G06T 19/00* (2011.01)

(52) U.S. Cl.
CPC ............ *G06T 19/20* (2013.01); *G06T 19/006* (2013.01); *G06T 2219/2012* (2013.01); *G06T 2219/2016* (2013.01); *G06T 2219/2024* (2013.01)

(58) Field of Classification Search
None
See application file for complete search history.

(56) References Cited

U.S. PATENT DOCUMENTS

| | | | |
|---|---|---|---|
| 5,751,850 | A | 5/1998 | Rindtorff |
| 6,020,891 | A | 2/2000 | Rekimoto |
| 6,038,295 | A | 3/2000 | Mattes |
| 6,867,787 | B1 | 3/2005 | Shimizu et al. |

(Continued)

FOREIGN PATENT DOCUMENTS

| | | |
|---|---|---|
| CA | 2887596 | 7/2015 |
| CN | 110168478 | 8/2019 |

(Continued)

OTHER PUBLICATIONS

US 10,964,114 B2, 03/2021, Hare et al. (withdrawn)

(Continued)

*Primary Examiner* — Jeffrey J Chow
(74) *Attorney, Agent, or Firm* — Schwegman Lundberg & Woessner, P.A.

(57) ABSTRACT

Aspects of the present disclosure involve a system comprising a computer-readable storage medium storing at least one program and a method for rendering a virtual object in a real-world environment depicted in image content based on contextual information. A virtual object template is selected. One or more stylizations for the virtual object template are determined based on contextual information associated with a computing device. A virtual object is generated by applying the one or more stylizations to the virtual object template. The virtual object is rendered within a 3D space captured within a camera feed of the computing device.

20 Claims, 12 Drawing Sheets

(56) References Cited

U.S. PATENT DOCUMENTS

| | | | |
|---|---|---|---|
| 6,980,909 | B2 | 12/2005 | Root et al. |
| 7,173,651 | B1 | 2/2007 | Knowles |
| 7,411,493 | B2 | 8/2008 | Smith |
| 7,535,890 | B2 | 5/2009 | Rojas |
| 8,131,597 | B2 | 3/2012 | Hudetz |
| 8,199,747 | B2 | 6/2012 | Rojas et al. |
| 8,332,475 | B2 | 12/2012 | Rosen et al. |
| 8,718,333 | B2 | 5/2014 | Wolf et al. |
| 8,724,622 | B2 | 5/2014 | Rojas |
| 8,730,156 | B2 | 5/2014 | Weising et al. |
| 8,874,677 | B2 | 10/2014 | Rosen et al. |
| 8,909,679 | B2 | 12/2014 | Root et al. |
| 8,995,433 | B2 | 3/2015 | Rojas |
| 9,040,574 | B2 | 5/2015 | Wang et al. |
| 9,055,416 | B2 | 6/2015 | Rosen et al. |
| 9,100,806 | B2 | 8/2015 | Rosen et al. |
| 9,100,807 | B2 | 8/2015 | Rosen et al. |
| 9,191,776 | B2 | 11/2015 | Root et al. |
| 9,204,252 | B2 | 12/2015 | Root |
| 9,430,791 | B1 | 8/2016 | Sutton-shearer |
| 9,443,227 | B2 | 9/2016 | Evans et al. |
| 9,489,661 | B2 | 11/2016 | Evans et al. |
| 9,491,134 | B2 | 11/2016 | Rosen et al. |
| 9,517,403 | B1 | 12/2016 | Kim et al. |
| 9,576,201 | B2 | 2/2017 | Wu et al. |
| 9,633,447 | B2 | 4/2017 | Swaminathan et al. |
| 9,645,394 | B2 | 5/2017 | Kinnebrew et al. |
| 9,652,897 | B2 | 5/2017 | Osborn et al. |
| 9,789,403 | B1 | 10/2017 | Furment et al. |
| 9,980,100 | B1* | 5/2018 | Charlton ............ G06K 9/00697 |
| 10,173,141 | B1 | 1/2019 | Schindler et al. |
| 10,242,503 | B2 | 3/2019 | McPhee et al. |
| 10,387,730 | B1 | 8/2019 | Cowburn et al. |
| 10,740,978 | B2 | 8/2020 | McPhee et al. |
| 11,030,813 | B2 | 6/2021 | Hare et al. |
| 2004/0212630 | A1 | 10/2004 | Hobgood et al. |
| 2005/0041842 | A1 | 2/2005 | Frakes et al. |
| 2007/0018811 | A1 | 1/2007 | Gollu |
| 2007/0096678 | A1 | 5/2007 | Melrose |
| 2008/0078758 | A1 | 4/2008 | Shimura et al. |
| 2009/0160779 | A1 | 6/2009 | Crockett et al. |
| 2009/0215536 | A1* | 8/2009 | Yee .................... A63F 13/63 463/42 |
| 2010/0251101 | A1 | 9/2010 | Haussecker et al. |
| 2011/0161242 | A1 | 6/2011 | Chung et al. |
| 2011/0183732 | A1 | 7/2011 | Block et al. |
| 2011/0202598 | A1 | 8/2011 | Evans et al. |
| 2012/0002014 | A1 | 1/2012 | Walsh |
| 2012/0092329 | A1 | 4/2012 | Koo et al. |
| 2012/0120186 | A1 | 5/2012 | Diaz et al. |
| 2012/0194549 | A1 | 8/2012 | Osterhout et al. |
| 2012/0206558 | A1* | 8/2012 | Setton .................... H04N 7/147 348/14.03 |
| 2012/0209924 | A1 | 8/2012 | Evans et al. |
| 2013/0021373 | A1 | 1/2013 | Vaught et al. |
| 2013/0050258 | A1 | 2/2013 | Liu et al. |
| 2013/0127980 | A1 | 5/2013 | Haddick et al. |
| 2013/0141434 | A1 | 6/2013 | Sugden et al. |
| 2013/0223673 | A1 | 8/2013 | Davis et al. |
| 2013/0278631 | A1 | 10/2013 | Border et al. |
| 2014/0028713 | A1 | 1/2014 | Keating et al. |
| 2014/0078176 | A1 | 3/2014 | Kim et al. |
| 2014/0176608 | A1 | 6/2014 | Boysen et al. |
| 2014/0267410 | A1 | 9/2014 | Fein et al. |
| 2014/0321702 | A1 | 10/2014 | Schmalstieg |
| 2014/0351758 | A1 | 11/2014 | Yoshida |
| 2015/0098614 | A1 | 4/2015 | Gee et al. |
| 2015/0103183 | A1 | 4/2015 | Abbott et al. |
| 2015/0254467 | A1 | 9/2015 | Leuthardt et al. |
| 2015/0262029 | A1 | 9/2015 | Pirchheim et al. |
| 2015/0264304 | A1 | 9/2015 | Chastney et al. |
| 2015/0269783 | A1 | 9/2015 | Yun |
| 2015/0301599 | A1 | 10/2015 | Miller |
| 2016/0025978 | A1 | 1/2016 | Mallinson |
| 2016/0063600 | A1 | 3/2016 | Wuang |
| 2016/0085773 | A1* | 3/2016 | Chang .................... H04W 4/02 715/753 |
| 2016/0109940 | A1 | 4/2016 | Lyren et al. |
| 2016/0171739 | A1 | 6/2016 | Anderson et al. |
| 2016/0330522 | A1 | 11/2016 | Newell et al. |
| 2016/0360115 | A1 | 12/2016 | Rim |
| 2016/0379418 | A1 | 12/2016 | Osborn et al. |
| 2017/0038829 | A1 | 2/2017 | Lanier et al. |
| 2017/0039986 | A1 | 2/2017 | Lanier et al. |
| 2017/0052946 | A1 | 2/2017 | Gu et al. |
| 2017/0069134 | A1 | 3/2017 | Shapira et al. |
| 2017/0090747 | A1 | 3/2017 | Dash |
| 2017/0178272 | A1 | 6/2017 | Lashkari et al. |
| 2017/0221272 | A1 | 8/2017 | Li et al. |
| 2017/0229153 | A1 | 8/2017 | Moore et al. |
| 2017/0243352 | A1 | 8/2017 | Kutliroff et al. |
| 2017/0255450 | A1 | 9/2017 | Mullins et al. |
| 2017/0278308 | A1 | 9/2017 | Bleiweiss et al. |
| 2017/0287060 | A1 | 10/2017 | Choi et al. |
| 2017/0329488 | A1 | 11/2017 | Welker et al. |
| 2017/0361225 | A1 | 12/2017 | Goslin et al. |
| 2018/0005429 | A1 | 1/2018 | Osman et al. |
| 2018/0040166 | A1 | 2/2018 | Jayaraj et al. |
| 2018/0061072 | A1 | 3/2018 | Benezra et al. |
| 2018/0082430 | A1 | 3/2018 | Sharma et al. |
| 2018/0108179 | A1 | 4/2018 | Tomlin et al. |
| 2018/0114365 | A1 | 4/2018 | Egri et al. |
| 2018/0122142 | A1* | 5/2018 | Egeler .................... G06F 3/011 |
| 2018/0143748 | A1* | 5/2018 | Ahmed ............. H04N 21/4312 |
| 2018/0143950 | A1 | 5/2018 | Al-arnaouti et al. |
| 2018/0152400 | A1 | 5/2018 | Chung et al. |
| 2018/0174600 | A1 | 6/2018 | Chaudhuri et al. |
| 2018/0189743 | A1 | 7/2018 | Balasubramanian et al. |
| 2018/0197343 | A1* | 7/2018 | Hare .................... G06F 3/0346 |
| 2018/0210628 | A1 | 7/2018 | Mcphee et al. |
| 2018/0285647 | A1 | 10/2018 | Chen et al. |
| 2018/0336714 | A1* | 11/2018 | Stoyles ................ G11B 27/036 |
| 2018/0349451 | A1 | 12/2018 | O'connell et al. |
| 2019/0004688 | A1 | 1/2019 | Bowen |
| 2019/0011703 | A1 | 1/2019 | Robaina et al. |
| 2019/0073834 | A1 | 3/2019 | Holzer et al. |
| 2019/0107991 | A1 | 4/2019 | Spivack et al. |
| 2019/0188920 | A1 | 6/2019 | Mcphee et al. |
| 2019/0221031 | A1* | 7/2019 | de la Carcova ....... A63F 13/212 |
| 2019/0251720 | A1* | 8/2019 | Hariton .................... G06T 19/00 |
| 2019/0304189 | A1 | 10/2019 | Falstrup et al. |
| 2019/0311341 | A1 | 10/2019 | Rice |
| 2019/0385378 | A1 | 12/2019 | Bastian et al. |
| 2020/0066014 | A1 | 2/2020 | Mehta et al. |
| 2020/0074738 | A1 | 3/2020 | Hare et al. |
| 2020/0082535 | A1 | 3/2020 | Lindskog et al. |
| 2020/0105006 | A1 | 4/2020 | Karsch et al. |
| 2020/0202632 | A1 | 6/2020 | Goodrich et al. |
| 2020/0327734 | A1 | 10/2020 | Goodrich et al. |
| 2020/0334916 | A1 | 10/2020 | Mcphee et al. |
| 2020/0380259 | A1* | 12/2020 | Cahill .................... G06T 13/40 |
| 2020/0410763 | A1 | 12/2020 | Hare et al. |
| 2021/0042993 | A1 | 2/2021 | Tagra et al. |
| 2021/0132686 | A1* | 5/2021 | Awaji ................. G02B 27/0093 |
| 2021/0174600 | A1 | 6/2021 | Hare et al. |
| 2021/0256773 | A1 | 8/2021 | Hare et al. |
| 2021/0264668 | A1 | 8/2021 | Goodrich et al. |

FOREIGN PATENT DOCUMENTS

| | | |
|---|---|---|
| CN | 112639691 A | 4/2021 |
| EP | 3086292 A1 | 10/2016 |
| EP | 3506213 A1 | 7/2019 |
| WO | 2011109126 | 9/2011 |
| WO | 2018081125 | 5/2018 |
| WO | 2018128930 | 7/2018 |
| WO | 2018129531 | 7/2018 |
| WO | 2020047117 | 3/2020 |
| WO | WO-2020132541 A1 | 6/2020 |
| WO | WO-2020264551 A2 | 12/2020 |

(56) References Cited

FOREIGN PATENT DOCUMENTS

| WO | WO-2020264551 A3 | 2/2021 |
|---|---|---|
| WO | WO-2021046582 A1 | 3/2021 |

OTHER PUBLICATIONS

"U.S. Appl. No. 16/242,708, Examiner Interview Summary dated Jul. 29, 2020", 3 pgs.
"U.S. Appl. No. 16/242,708, Final Office Action dated Jul. 2, 2020", 25 pgs.
"U.S. Appl. No. 16/242,708, Notice of Allowance dated Aug. 19, 2020", 5 pgs.
"U.S. Appl. No. 16/242,708, Response filed May 15, 2020 to Non Final Office Action dated Feb. 28, 2020", 11 pgs.
"U.S. Appl. No. 16/242,708, Response filed Aug. 5, 2020 to Final Office Action dated Jul. 2, 2020", 11 pgs.
"U.S. Appl. No. 16/283,482, Notice of Allowance dated Apr. 2, 2020", 9 pgs.
"U.S. Appl. No. 16/457,461, Examiner Interview Summary dated Jul. 10, 2020", 3 pgs.
"U.S. Appl. No. 16/457,461, Final Office Action dated Jul. 14, 2020", 16 pgs.
"U.S. Appl. No. 16/457,461, Non Final Office Action dated Apr. 16, 2020", 13 pgs.
"U.S. Appl. No. 16/457,461, Response filed Jul. 1, 2020 to Non Final Office Action dated Apr. 16, 2020", 9 pgs.
"U.S. Appl. No. 16/457,461, Response filed Aug. 20, 2020 to Final Office Action dated Jul. 14, 2020", 8 pgs.
"International Application Serial No. PCT/US2019/068007, International Search Report dated Apr. 30, 2020", 10 pgs.
"International Application Serial No. PCT/US2019/068007, invitation to Pay Additional Fees dated Mar. 11, 2020", 18 pgs.
"International Application Serial No. PCT/US2019/068007, Written Opinion dated Apr. 30, 2020", 15 pgs.
Giaccone, P R, et al., "Foreground-background segmentation by cellular neural networks", IEEE 15th International Conference on Pattern Recognition (ICPR—2000), vol. 2, (2000), 438-441.
Kawai, Norihiko, et al., "Diminished Reality Based on Image Inpainting Considering Background Geometry", IEEE transactions on visualization and computer graphics, 22(3), (Mar. 1, 2016), 1236-1247.
Marto, Anabela G R, et al., "DinofelisAR Demo: Augmented Reality Based on Natural Features", 12th Iberian Conference on Information Systems and Technologies (CISTI), Lisbon, Portugal, (Jun. 2017), 6 pgs.
Nakajima, Yoshikatsu, et al., "Semantic Object Selection and Detection for Diminished Reality Based on SLAM with Viewpoint Class", IEEE International Symposium on Mixed and Augmented Reality Adjunct Proceedings, (2017), 338-343.
Salas-Morena, Renato F, et al., "Dense Planar SLAM", IEEE Intl. Symposium on Mixed and Augmented Reality (ISMAR), Munich, Germany, [Online] Retrieved from the Internet: <URL: http://www.doc.ic.ac.uk/~bglocker/pdfs/salas-moreno2014ismar.pdf>, (Sep. 2014), 8 pgs.
Schettini, R, et al., "A segmentation algorithm for color images", Pattern Recognition Letters, Elsevier, Amsterdam, NL, vol. 14, No. 6, (Jun. 1, 1993), 499-506.
Shohei, Mori, et al., "A survey of diminished reality: Techniques for visually concealing, eliminating, and seeing through real objects", IPSJ Transactions on Computer Vision and Applications, vol. 9, No. 1, (Jun. 28, 2017), 14 pgs.
"International Application Serial No. PCT/US2017/058093, International Search Report dated Jan. 4, 2018", 2 pgs.
"International Application Serial No. PCT/US2017/058093, Written Opinion dated Jan. 4, 2018", 4 pgs.
"International Application Serial No. PCT/US2017/068988, International Search Report dated Apr. 5, 2018", 3 pgs.
"International Application Serial No. PCT/US2017/068988, Written Opinion dated Apr. 5, 2018", 6 pgs.
"International Application Serial No. PCT/US2018/012967, International Search Report dated May 15, 2018", 5 pgs.
"International Application Serial No. PCT/US2018/012967, Written Opinion dated May 15, 2018", 6 pgs.
"U.S. Appl. No. 15/581,994, Non Final Office Action dated Jun. 26, 2018", 14 pgs.
"U.S. Appl. No. 15/863,575, Non Final Office Action dated Aug. 9, 2018", 14 pgs.
"U.S. Appl. No. 15/863,575, Response filed Sep. 24, 2018 to Non Final Office Action dated Aug. 9, 2018", 9 pgs.
"U.S. Appl. No. 15/581,994, Response filed Sep. 26, 2018 to Non Final Office Action dated Jun. 26, 2018", 11 pgs.
"U.S. Appl. No. 15/863,575, Notice of Allowance dated Nov. 15, 2018", 8 pgs.
"U.S. Appl. No. 15/581,994, Final Office Action dated Dec. 3, 2018", 18 pgs.
"U.S. Appl. No. 15/581,994, Response filed Feb. 26, 2019 to Final Office Action dated Dec. 3, 2018", 11 pgs.
"U.S. Appl. No. 15/581,994, Non Final Office Action dated Jun. 6, 2019", 15 pgs.
"U.S. Appl. No. 16/283,482, Non Final Office Action dated Jun. 26, 2019", 13 pgs.
"International Application Serial No. PCT/US2018/012967, International Preliminary Report on Patentability dated Jul. 18, 2019", 8 pgs.
"U.S. Appl. No. 15/581,994, Response filed Aug. 19, 2019 to Non-Final Office Action dated Jun. 6, 2019", 12 pgs.
"U.S. Appl. No. 16/283,482, Response filed Sep. 26, 2019 to Non Final Office Action dated Jun. 26, 2019", 13 pgs.
"U.S. Appl. No. 15/581,994, Notice of Allowance dated Nov. 6, 2019", 8 pgs.
"International Application Serial No. PCT/US2019/048597, International Search Report dated Dec. 2, 2019", 5 pgs.
"International Application Serial No. PCT/US2019/048597, Written Opinion dated Dec. 2, 2019", 8 pgs.
"U.S. Appl. No. 16/283,482, Final Office Action dated Dec. 16, 2019", 15 pgs.
"U.S. Appl. No. 15/581,994, Corrected Notice of Allowability dated Jan. 7, 2020", 2 pgs.
"U.S. Appl. No. 16/283,482, Examiner Interview Summary dated Feb. 19, 2020", 3 pgs.
"European Application Serial No. 18713732.8, Response to Communication Pursuant to Rules 161(1) and 162 EPC filed Feb. 19, 2020", 25 pgs.
"U.S. Appl. No. 16/242,708, Non Final Office Action dated Feb. 28, 2020", 19 pgs.
"U.S. Appl. No. 16/283,482, Response filed Mar. 9, 2020 to Final Office Action dated Dec. 16, 2019", 11 pgs.
Leyden, John, "This SMS will self-destruct in 40 seconds", [Online] Retrieved from the Internet: <URL: http://www.theregister.co.uk/2005/12/12/stealthtext/>, (Dec. 12, 2005), 1 pg.
Park, Jong-Seung, "Virtual Object Placement in Video for Augmented Reality", Advances in Multimedia Information Processing—PCM 2005: 6th Pacific Rim Conference on Multimedia, Jeju Island, KR, Proceedings (vol. 3767). Springer, Berlin, DE, (2005), 13-24.
U.S. Appl. No. 15/863,575 U.S. Pat. No. 10,242,503, filed Jan. 5, 2018, Surface Aware Lens.
U.S. Appl. No. 16/283,482 U.S. Pat. No. 10,740,978, filed Feb. 22, 2019, Surface Aware Lens.
U.S. Appl. No. 16/922,618, filed Jul. 7, 2020, Surface Aware Lens.
U.S. Appl. No. 16/723,540, filed Dec. 20, 2019, Virtual Surface Modification.
U.S. Appl. No. 16/696,600, filed Nov. 26, 2019, Rendering 3D Captions Within Real-World Environments.
U.S. Appl. No. 16/242,708, filed Jan. 8, 2019, Video Clip Object Tracking.
U.S. Appl. No. 16/457,461, filed Jun. 28, 2019, 3D Object Camera Customization System.
U.S. Appl. No. 16/721,459, filed Dec. 19, 2019, 3D Captions With Semantic Graphical Elements.
"U.S. Appl. No. 16/242,708, Corrected Notice of Allowability dated Feb. 23, 2021", 2 pgs.

(56) References Cited

OTHER PUBLICATIONS

"U.S. Appl. No. 16/242,708, Notice of Allowance dated Feb. 4, 2021", 7 pgs.
"U.S. Appl. No. 16/242,708, Notice of Allowance dated Nov. 4, 2020", 7 pgs.
"U.S. Appl. No. 16/457,461, Corrected Notice of Allowability dated Feb. 26, 2021", 2 pgs.
"U.S. Appl. No. 16/457,461, Notice of Allowance dated Sep. 2, 2020", 7 pgs.
"U.S. Appl. No. 16/457,461, Notice of Allowance dated Nov. 19, 2020", 8 pgs.
"U.S. Appl. No. 16/696,600, Non Final Office Action dated Sep. 15, 2020", 20 pgs.
"U.S. Appl. No. 16/696,600, Notice of Allowability dated Jan. 26, 2021", 2 pgs.
"U.S. Appl. No. 16/696,600, Notice of Allowance dated Dec. 18, 2020", 11 pgs.
"U.S. Appl. No. 16/696,600, Response filed Oct. 30, 2020 to Non Final Office Action dated Sep. 15, 2020", 8 pgs.
"International Application Serial No. PCT/US2019/048597, International Preliminary Report on Patentability dated Mar. 11, 2021", 10 pgs.
"International Application Serial No. PCT/US2020/070158, International Search Report dated Dec. 17, 2020", 5 pgs.
"International Application Serial No. PCT/US2020/070158, Invitation to Pay Additional Fees dated Oct. 1, 2020", 12 pgs.
"International Application Serial No. PCT/US2020/070158, Written Opinion dated Dec. 17, 2020", 12 pgs.
"International Application Serial No. PCT/US2020/070503, International Search Report dated Dec. 2, 2020", 5 pgs.
"International Application Serial No. PCT/US2020/070503, Written Opinion dated Dec. 2, 2020", 7 pgs.
"Korean Application Serial No. 10-2019-7023098, Notice of Preliminary Rejection dated Oct. 8, 2020", w/ English translation, 15 pgs.
"Korean Application Serial No. 10-2019-7023098, Response filed Jan. 8, 2021 to Notice of Preliminary Rejection dated Oct. 8, 2020", w/English Claims, 19 pgs.
Park, Jungsik, et al., "[Poster] Interactive deformation of real objects", 2014 IEEE International Symposium on Mixed and Augmented Reality (ISMAR), (Sep. 10, 2014), 295-296.
Robinson, Ian, "Add 3D text to video footage", Adobe.com/Youtube video, [Online] Retrieved from the Internet: <URL: https://helpx.adobe.com/after-effects/how-to/add-3d-text-video-footage.html>, (Mar. 10, 2017), 360 pgs.; 15:22 min.
"U.S. Appl. No. 16/457,461, Notice of Allowance dated Apr. 14, 2021", 7 pgs.
"U.S. Appl. No. 16/457,461, Notice of Allowance dated Jul. 28, 2021", 5 pgs.
"U.S. Appl. No. 16/696,600, 312 Amendment dated Jul. 7, 2021", 7 pgs.
"U.S. Appl. No. 16/696,600, Corrected Notice of Allowability dated May 12, 2021", 2 pgs.
"U.S. Appl. No. 16/696,600, Corrected Notice of Allowability dated Jul. 21, 2021", 3 pgs.
"U.S. Appl. No. 16/696,600, Notice of Allowance dated May 4, 2021", 9 pgs.
"U.S. Appl. No. 16/721,459, Non Final Office Action dated Apr. 15, 2021", 17 pgs.
"U.S. Appl. No. 16/721,459, Response filed Jul. 6, 2021 to Non Final Office Action dated Apr. 15, 2021", 10 pgs.
"U.S. Appl. No. 16/723,540, Examiner Interview Summary dated Jun. 16, 2021", 2 pgs.
"U.S. Appl. No. 16/723,540, Non Final Office Action dated Mar. 18, 2021", 15 pgs.
"U.S. Appl. No. 16/723,540, Response filed Jun. 16, 2021 to Non Final Office Action dated Mar. 18, 2021", 10 pgs.
"U.S. Appl. No. 16/922,618, Non Final Office Action dated Apr. 27, 2021", 9 pgs.
"U.S. Appl. No. 16/922,618, Notice of Allowance dated Aug. 4, 2021", 9 pgs.
"U.S. Appl. No. 16/922,618, Response filed Jun. 17, 2021 to Non Final Office Action dated Apr. 27, 2021", 7 pgs.
"European Application Serial No. 21153993.7, Extended European Search Report dated May 12, 2021", 9 pgs.
"International Application Serial No. PCT/US2019/068007, International Preliminary Report on Patentability dated Jul. 1, 2021", 17 pgs.
"Korean Application Serial No. 10-2021-7015384, Notice of Preliminary Rejection dated Jun. 11, 2021", w/ English Translation, 13 pgs.
You, Suya, et al., "Hybrid Inertial and Vision Tracking for Augmented Reality Registration", (1999), 8 pgs.
U.S. Appl. No. 17/319,399, filed May 13, 2021, Rendering 3D Captions Within Real-World Environments.
U.S. Appl. No. 17/307,354, filed May 4, 2021, Video Clip Object Tracking.
"U.S. Appl. No. 16/696,600, Notice of Allowance dated Aug. 17, 2021", 8 pgs.
"U.S. Appl. No. 16/721,459, Notice of Allowance dated Aug. 19, 2021", 10 pgs.

* cited by examiner

CONTEXT-BASED VIRTUAL OBJECT RENDERING

PRIORITY CLAIM

This application is a non-provisional of and claims the benefit of priority under 35 U.S.C. § 119(e) from, U.S. Provisional Application Ser. No. 62/897,001, entitled "CONTEXT-BASED VIRTUAL OBJECT RENDERING," filed on Sep. 6, 2019, which is hereby incorporated by reference.

TECHNICAL FIELD

The present disclosure relates generally to visual presentations and more particularly to rendering a virtual object in a real-world environment depicted in a camera feed based on contextual data.

BACKGROUND

Virtual rendering systems can be used to create augmented reality experiences, in which three-dimensional (3D) virtual object graphics content appears to be present in the real-world. Many conventional virtual rendering systems often render basic static templates that are common to all users and often fail to provide engaging and entertaining augmented reality experiences. These systems can also be subject to presentation problems due to environmental conditions, user actions, unanticipated visual interruption between a camera and the object being rendered, and the like.

BRIEF DESCRIPTION OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some embodiments are illustrated by way of example, and not limitation, in the figures of the accompanying drawings in which.

DETAILED DESCRIPTION

Figure 1:
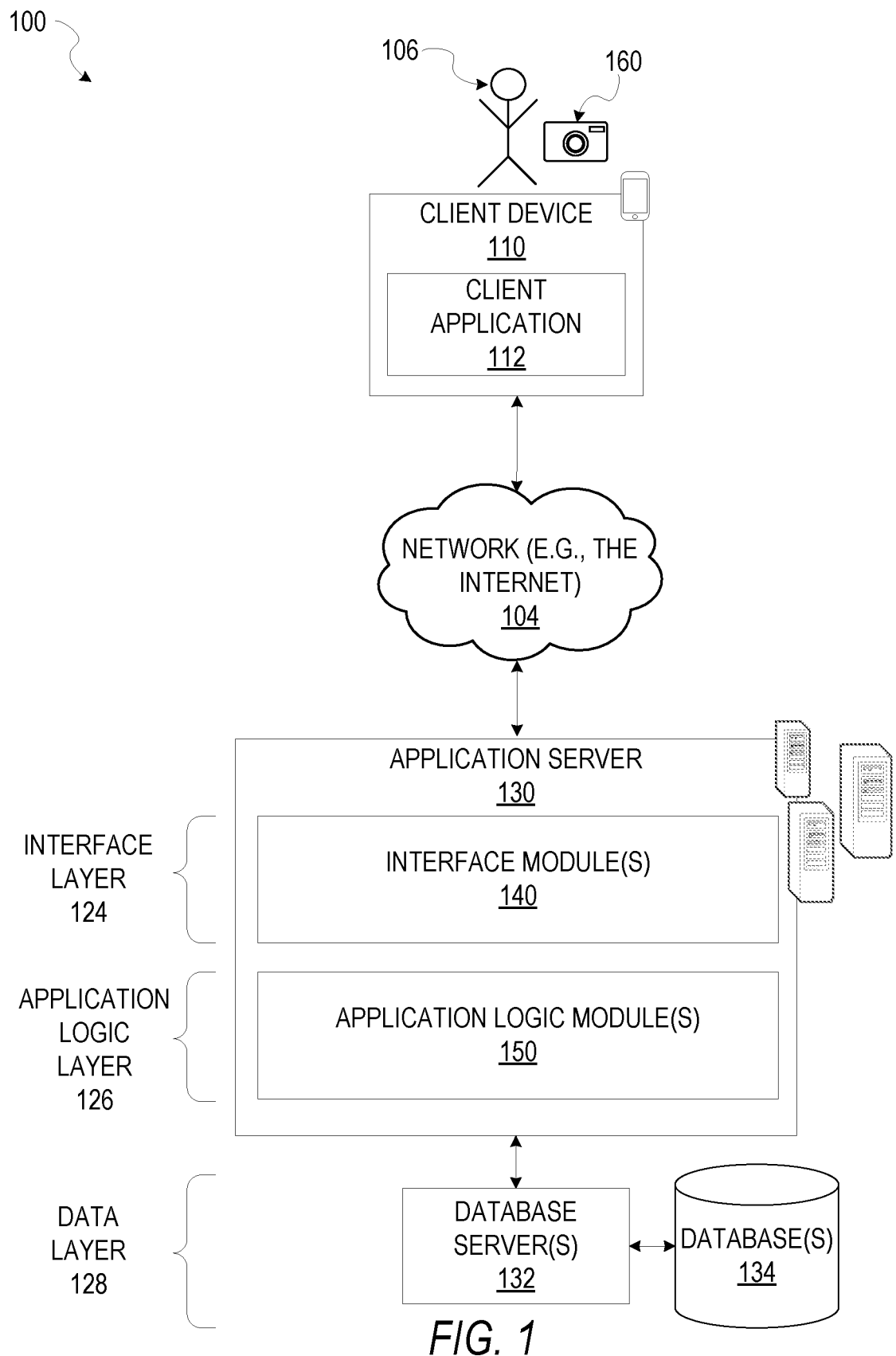
FIG. 1 is a system diagram illustrating an example communication system for rendering a virtual object based on contextual information, according to some example embodiments.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Among other things, embodiments of the present disclosure improve the functionality of virtual rendering systems by creating augmented reality experiences that utilize contextual information to render virtual objects to 3D real-world environments depicted in image data (e.g., images and video) as if the objects exist in the real-world environments. In rendering a virtual object, a virtual rendering system uses a set of rules that may specify a manner in which the virtual object is to be rendered based on one or more contextual signals in the contextual information. More specifically, the virtual rendering system uses the set of rules to determine stylizations that may be added to a virtual object template to generate a virtual object for rendering as well as a behavior of the virtual object when rendered, in some embodiments.

The contextual signals may provide information about an environment surrounding a mobile device associated with the virtual object rendering. For example, contextual information may include one or more of: user input data; biometric data; motion data; environmental data; position data; temporal data; event data describing an event; location data describing a location of the computing device; a visual attribute of image data generated by the camera; an object detected image data generated by the camera; an action or gesture detected image data generated by the camera; weather conditions data; audio data produced by a microphone in communication with the computing device; a gaze of a user of the computing device; or an attribute of the virtual object. The one or more stylizations may, for example, include any one or more of: a color; a texture; a size; an object geometry; an opacity; a typography; a typographical emphasis; an adornment; or an additional virtual representation related to the virtual object. The behavior of the virtual object may correspond to an animated movement or action of the virtual object.

As a first example, if the surrounding environment is a beach, the rendering system may render a virtual object with a sand-like texture. As a second example, if the temperature is below 32 degrees Fahrenheit, the rendering system may render a virtual object with an icicle-like adornment. As a third example, rendering system may render heart and/or smile emojis based on detecting a user typing "love". As a fourth example, if the virtual object includes the text string "I am mad" the rendering system may render the virtual object along with smoke and/or flame emojis. As a fifth example, if a bowl of ramen is depicted in a camera feed, the virtual rendering system may render a ramen cat at a location in the environment based on the bowl of ramen. As a fifth example, while at a rice and ramen restaurant, the rendering system may render a virtual object comprising the words "rice and ramen". In this example, the text "rice and ramen" may be rendered along with cherry blossom petals based on the virtual rendering system determining a user is happy based on one or more biometric signals.

FIG. 1 is a system diagram illustrating an example communication system 100 for rendering a virtual object based on contextual information, according to some example embodiments. The communication system 100 may, for example, be a messaging system where clients communicate and exchange data within the communication system 100, where certain data is communicated to and from wearable devices described herein. The data may pertain to various functions (e.g., sending and receiving image content as well as text and other media communication) and aspects associated with the communication system 100 and its users. Although the communication system 100 is illustrated herein as having a client-server architecture, other embodiments may include other network architectures, such as peer-to-peer or distributed network environments.

As shown in FIG. 1, the communication system 100 includes an application server 130. The application server 130 is generally based on a three-tiered architecture, consisting of an interface layer 124, an application logic layer 126, and a data layer 128. As is understood by skilled artisans in the relevant computer and Internet-related arts, each module or engine shown in FIG. 1 represents a set of executable software instructions and the corresponding hardware (e.g., memory and processor) for executing the instructions. In various embodiments, additional functional modules and engines may be used with a messaging system, such as that illustrated in FIG. 1, to facilitate additional functionality that is not specifically described herein. Furthermore, the various functional modules and engines depicted in FIG. 1 may reside on a single server computer or may be distributed across several server computers in various arrangements. Moreover, although the application server 130 is depicted in FIG. 1 as having a three-tiered architecture, the inventive subject matter is by no means limited to such an architecture.

As shown in FIG. 1, the interface layer 124 consists of interface modules (e.g., a web server) 140, which receive requests from various client-devices and servers, such as client device 110 executing client application 112. In response to received requests, the interface modules 140 communicate appropriate responses to requesting devices via a network 104. For example, the interface modules 140 can receive requests such as Hypertext Transfer Protocol (HTTP) requests or other web-based application programming interface (API) requests.

The client device 110 can execute conventional web browser applications or applications (also referred to as "apps") that have been developed for a specific platform to include any of a wide variety of mobile devices and mobile-specific operating systems (e.g., IOS™, ANDROID™ WINDOWS® PHONE). In an example, the client device 110 are executing the client application 112. The client application 112 can provide functionality to present information to user 106 and communicate via the network 104 to exchange information with the application server 130. Each of the client device 110 can comprise a device that includes at least a display and communication capabilities with the network 104 to access the application server 130. The client device 110 comprise, but are not limited to, remote devices, work stations, computers, general-purpose computers, Internet appliances, hand-held devices, wireless devices, portable devices, wearable computers, cellular or mobile phones, personal digital assistants (PDAs), smart phones, tablets, ultrabooks, netbooks, laptops, desktops, multi-processor systems, microprocessor-based or programmable consumer electronics, game consoles, set-top boxes, network personal computers (PCs), mini-computers, and the like. The user 106 can include a person, a machine, or other means of interacting with the client device 110. In some embodiments, the user 106 interact with the application server 130 via the client device 110, respectively.

An individual can register with the application server 130 to become a member of the application server 130. Once registered, a member can form social network relationships (e.g., friends, followers, or contacts) on the application server 130 and interact with a broad range of applications provided by the application server 130.

The application logic layer 126 includes various application logic modules 150, which, in conjunction with the interface modules 140, generate various user interfaces with data retrieved from various data sources or data services in the data layer 128. Individual application logic modules 150 may be used to implement the functionality associated with various applications, services, and features of the application server 130. For instance, a messaging application can be implemented with one or more of the application logic modules 150. The messaging application provides a messaging mechanism for users of the client device 110 to send and receive messages that include text and media content such as pictures and video. The client device 110 may access and view the messages from the messaging application for a specified period of time (e.g., limited or unlimited). In an example, a particular message is accessible to a message recipient for a predefined duration (e.g., specified by a message sender) that begins when the particular message is first accessed. After the predefined duration elapses, the message is deleted and is no longer accessible to the message recipient.

Additionally, the application logic modules 150 may provide functionality to generate, render, and track virtual objects within a 3D real-world environment depicted in a camera feed produced by camera 160 of the client device 110. The camera feed comprises image data that includes a sequence of images (e.g., a video) depicting a real-world environment and the display of the virtual object is overlaid on a real-world environment. Accordingly, the application logic module 150 may cause the client device 110 to display a virtual object as part of an augmented reality experience in which the user 106 may view, interact with, and modify the virtual object.

A virtual rendering system implemented at least in part within the application logic modules 150 determines a manner in which a virtual object is rendered based on a set of rules. For example, virtual objects rendered by the virtual rendering system may be rendered with one or more stylizations determined based on contextual information associated with the client device 110. As another example, rendering a virtual object may include rendering the virtual object with one or more behaviors determined from the contextual information associated with the client device.

A virtual object may be included in one or more messages exchanged using the messaging application, for example. These messages may include media content comprising one or more images of a real-world environment that is augmented to include the display of the virtual object overlaid on the real-world environment. The media content may further include audio data recorded in conjunction with the capturing of the images.

The camera 160 is communicatively coupled to the client device 110. For example, in some embodiments, the camera 160 may be embedded in the client device 110 (e.g., a smartphone with an embedded camera). In some embodiments, the camera 160 may be embedded in a companion device.

As shown in FIG. 1, the data layer 128 has one or more database servers 132 that facilitate access to information storage repositories or databases 134. The databases 134 store data such as virtual object templates, member profile data, social graph data (e.g., relationships between members of the application server 130), and other user data. For example, a database 134 may store a collection of virtual object templates that provide a basis for virtual objects to be rendered by the virtual rendering system. The virtual rendering system may select a virtual object template from the database 134 and apply one or more stylizations to the virtual object template to generate a virtual object.

Figure 2:
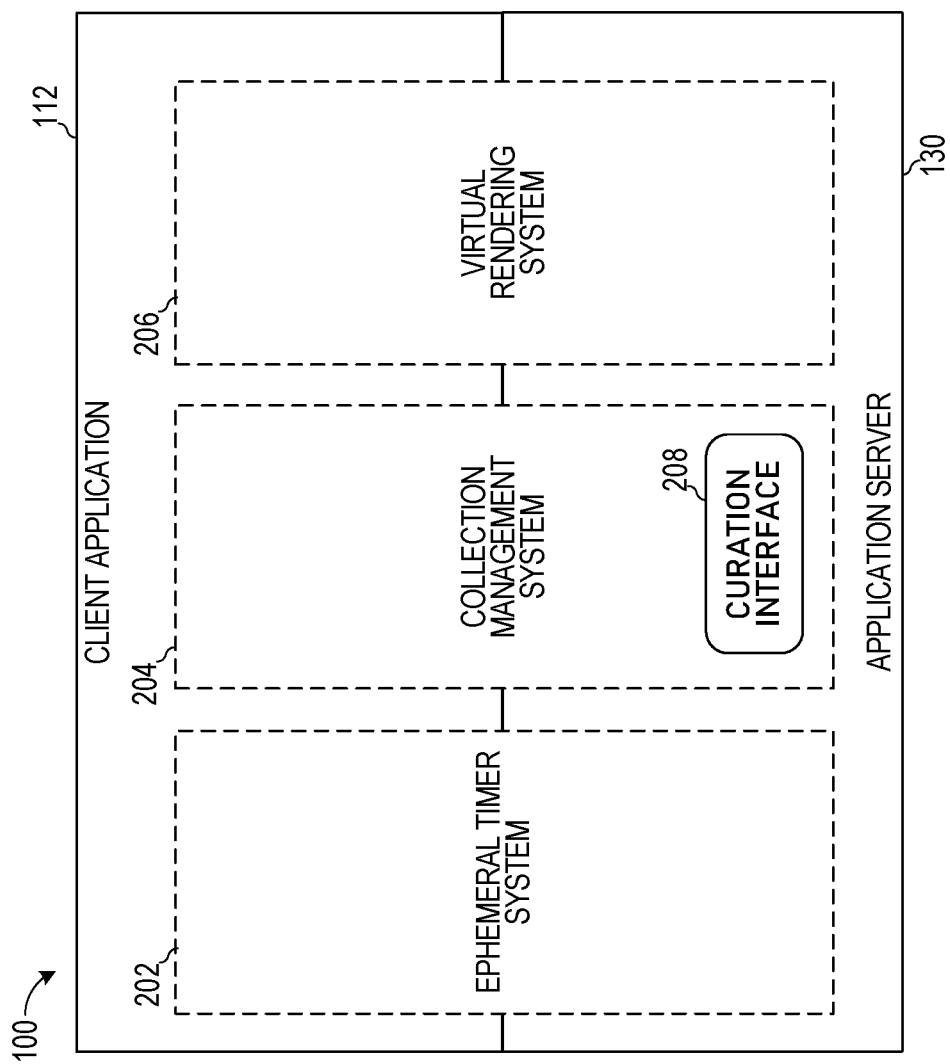
FIG. 2 is block diagram illustrating further details of the communication system, according to example embodiments.

FIG. 2 is block diagram illustrating further details regarding the communication system 100, according to example embodiments. Specifically, the communication system 100 is shown to comprise the client application 112 and the application server 130, which in turn embody a number of subsystems, namely an ephemeral timer system 202, a collection management system 204, and a virtual rendering system 206.

The ephemeral timer system 202 is responsible for enforcing temporary access to content permitted by the client application 112 and the application server 130. To this end, the ephemeral timer system 202 incorporates a number of timers that, based on duration and display parameters associated with a message, or collection of messages (e.g., a story), selectively display and enable access to messages and associated content via the client application 112.

The collection management system 204 is responsible for managing collections of media (e.g., collections of text, image, video, and audio data). In some examples, a collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert.

The collection management system 204 furthermore includes a curation interface 208 that allows a collection manager to manage and curate a particular collection of content. For example, the curation interface 208 enables an event organizer to curate a collection of content relating to a specific event (e.g., delete inappropriate content or redundant messages). Additionally, the collection management system 204 employs machine vision (or image recognition technology) and content rules to automatically curate a content collection.

The virtual rendering system 206 provides functionality to generate, render, and track virtual objects within a 3D real-world environment depicted in a live camera feed of the client device 110. The virtual object may comprise a media overlay. A media overlay may include audio and visual content and visual effects and animations. Examples of audio and visual content include pictures, texts, logos, animations, and sound effects. The audio and visual content or the visual effects can be applied to a media content item (e.g., an image). For example, the media overlay includes text that can be overlaid on top of an image generated by the camera 160. Templates for such media overlays may be stored in the database 134 and accessed through the database server 132.

The virtual rendering system 206 also provides functions that enable a user to augment or otherwise modify or edit media content (e.g., comprising image data and/or audio data) with virtual object. For example, the virtual rendering system 206 provides functions related to the generation and publishing of virtual objects in messages processed by the communication system 100.

In an example embodiment, the virtual rendering system 206 provides a user-based publication platform that enables users to select a geolocation on a map and upload content associated with the selected geolocation. The user may also specify circumstances under which a particular virtual object or virtual object template should be offered to other users. The virtual rendering system 206 generates a media overlay that includes the uploaded content and associates the uploaded content with the selected geolocation.

Figure 3:
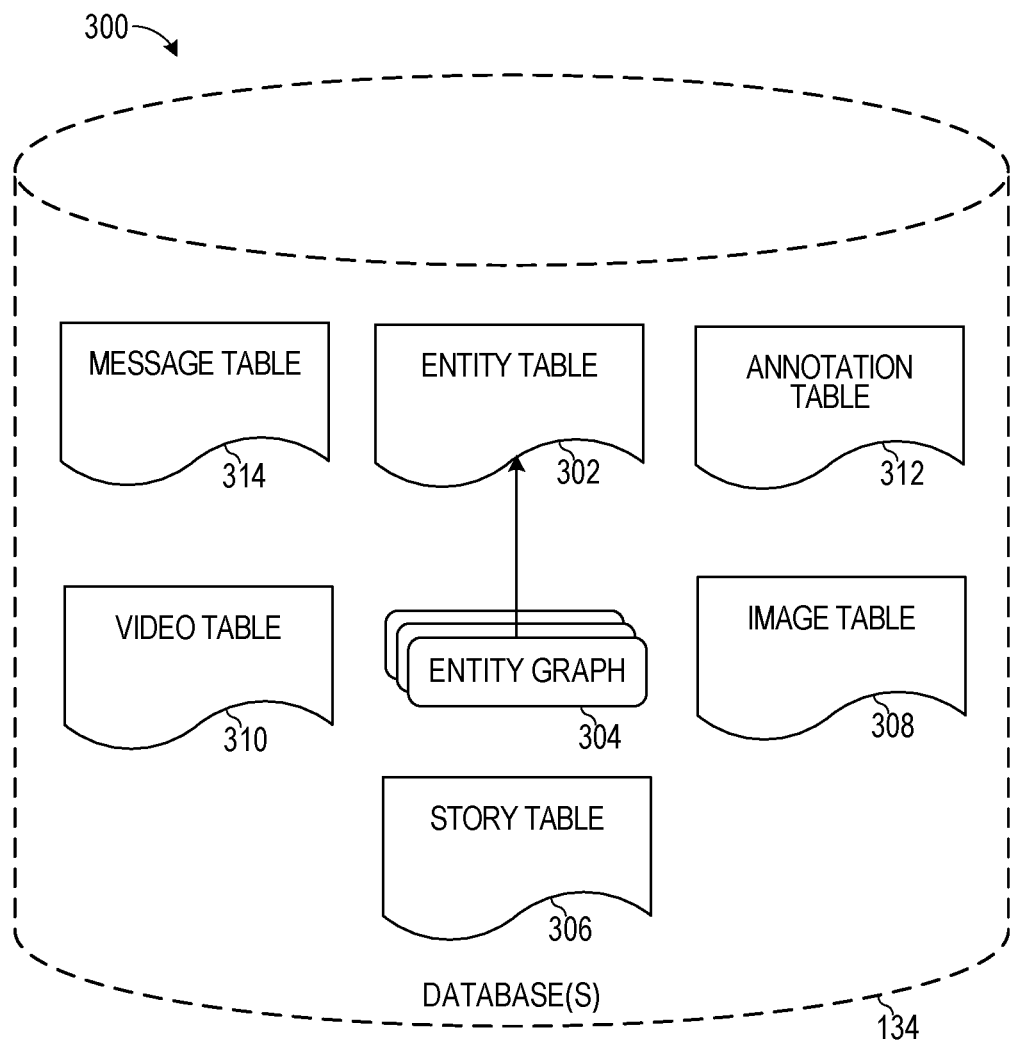
FIG. 3 is a schematic diagram illustrating data which may be stored in the database of the messaging server system, according to example embodiments.

FIG. 3 is a schematic diagram 300 illustrating data, which may be stored in the database 134 of the messaging server system 108, according to certain example embodiments. While the content of the database 134 is shown to comprise a number of tables, it will be appreciated that the data could be stored in other types of data structures (e.g., as an object-oriented database).

The database 134 includes message data stored within a message table 314. An entity table 302 stores entity data, including an entity graph 304. Entities for which records are maintained within the entity table 302 may include individuals, corporate entities, organizations, objects, places, events, and so forth. Regardless of type, any entity regarding which the messaging server system 108 stores data may be a recognized entity. Each entity is provided with a unique identifier, as well as an entity type identifier (not shown).

The entity graph 304 furthermore stores information regarding relationships and associations between entities. Such relationships may be social, professional (e.g., work at a common corporation or organization), interested-based, or activity-based, merely for example.

The database 134 also stores annotation data, in the example form of filters and lenses, in an annotation table 312. Filters and lens for which data is stored within the annotation table 312 are associated with and applied to videos (for which data is stored in a video table 310) and/or images (for which data is stored in an image table 308). Filters are overlays that are displayed as overlaid on an image or video during presentation to a recipient user. Lenses include real-time visual effects and/or sounds that may be added to real-world environments depicted in a camera feed (e.g., while a user is viewing the camera feed via one or more interfaces of the messaging client application 112, while composing a message, or during presentation to a recipient user). In some embodiments, filters are applied to an image or video after the image or video is captured at the client device 110 while a lens is applied to the camera feed of the client device 110 such that when an image or video is captured at the client device 110 with a lens applied, the applied lens is incorporated as part of the image or video that is generated. Filters and lenses may be of various types, including user-selected filters and lens from a gallery of filters or a gallery of lenses presented to a sending user by the messaging client application 112 when the sending user is composing a message.

As mentioned above, the video table 310 stores video data which, in one embodiment, is associated with messages for which records are maintained within the message table 314. Similarly, the image table 308 stores image data associated with messages for which message data is stored in the entity table 302. The entity table 302 may associate various annotations from the annotation table 312 with various images and videos stored in the image table 308 and the video table 310.

A story table 306 stores data regarding collections of messages and associated image, video, or audio data, which are compiled into a collection (e.g., a story or a gallery). The creation of a particular collection may be initiated by a particular user (e.g., each user for which a record is maintained in the entity table 302). A user may create a "personal story" in the form of a collection of content that has been created and sent/broadcast by that user. To this end, the UI of the messaging client application 112 may include an icon that is user selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users, whose client devices have location services enabled and are at a common location event at a particular time, may, for example, be presented with an option, via a user interface of the messaging client application 112, to contribute content to a particular live story. The live story may be identified to the user by the messaging client application 112, based on his or her location. The end result is a "live story" told from a community perspective.

A further type of content collection is known as a "location story," which enables a user whose client device 110 is located within a specific geographic location (e.g., on a college or university campus) to contribute to a particular collection. In some embodiments, a contribution to a location story may require a second degree of authentication to verify that the end user belongs to a specific organization or other entity (e.g., is a student on the university campus).

Figure 4:
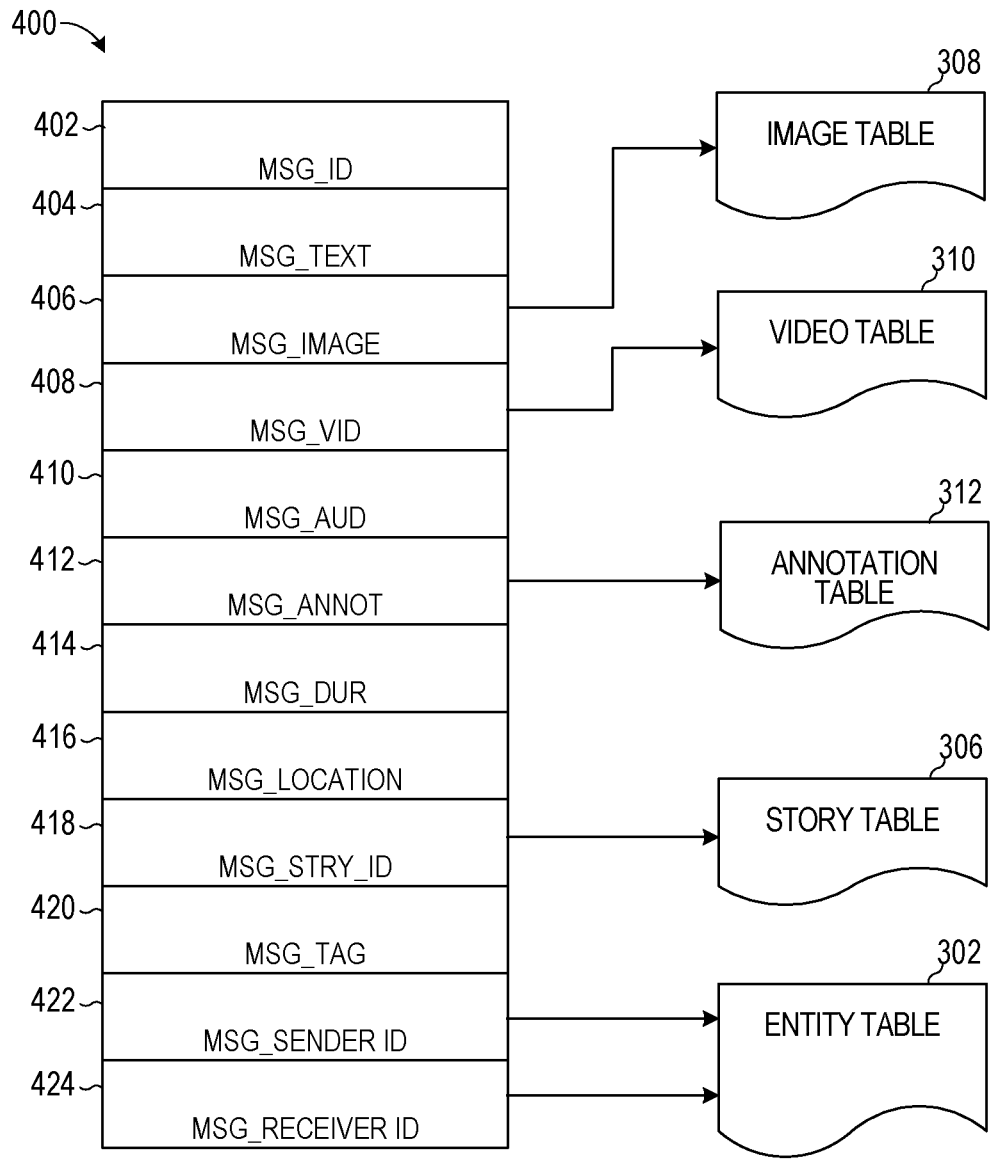
FIG. 4 is a schematic diagram illustrating a structure of a message generated by a messaging client application for communication, according to example embodiments.

FIG. 4 is a schematic diagram illustrating a structure of a message 400, according to some embodiments, generated by a messaging client application 112 for communication to a further messaging client application 112 or the messaging server application 130. The content of a particular message 400 is used to populate the message table 314 stored within the database 134, accessible by the messaging server application 130. Similarly, the content of a message 400 is stored in memory as "in-transit" or "in-flight" data of the client device 110 or the application server 130. The message 400 is shown to include the following components:

- A message identifier 402: a unique identifier that identifies the message 400.
- A message text payload 404: text, to be generated by a user via a user interface of the client device 110 and that is included in the message 400.
- A message image payload 406: image data, captured by a camera component of a client device 110 or retrieved from memory of a client device 110, and that is included in the message 400.
- A message video payload 408: video data, captured by a camera component or retrieved from a memory component of the client device 110 and that is included in the message 400.
- A message audio payload 410: audio data, captured by a microphone or retrieved from the memory component of the client device 110, and that is included in the message 400.
- A message annotations 412: annotation data (e.g., filters, stickers or other enhancements) that represents annotations to be applied to message image payload 406, message video payload 408, or message audio payload 410 of the message 400.
- A message duration parameter 414: parameter value indicating, in seconds, the amount of time for which content of the message (e.g., the message image payload 406, message video payload 408, message audio payload 410) is to be presented or made accessible to a user via the messaging client application 112.
- A message geolocation parameter 416: geolocation data (e.g., latitudinal and longitudinal coordinates) associated with the content payload of the message. Multiple message geolocation parameter 416 values may be included in the payload, with each of these parameter values being associated with respect to content items included in the content (e.g., a specific image into within the message image payload 406, or a specific video in the message video payload 408).
- A message story identifier 418: identifier value identifying one or more content collections (e.g., "stories") with which a particular content item in the message image payload 406 of the message 400 is associated. For example, multiple images within the message image payload 406 may each be associated with multiple content collections using identifier values.
- A message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.
- A message sender identifier 422: an identifier (e.g., a messaging system identifier, email address, or device identifier) indicative of a user of the client device 110 on which the message 400 was generated and from which the message 400 was sent.
- A message receiver identifier 424: an identifier (e.g., a messaging system identifier, email address or device identifier) indicative of a user of the client device 110 to which the message 400 is addressed.

The contents (e.g. values) of the various components of message 400 may be pointers to locations in tables within which content data values are stored. For example, an image value in the message image payload 406 may be a pointer to (or address of) a location within an image table 308. Similarly, values within the message video payload 408 may point to data stored within a video table 310, values stored within the message annotations 412 may point to data stored in an annotation table 312, values stored within the message story identifier 418 may point to data stored in a story table 306, and values stored within the message sender identifier 422 and the message receiver identifier 424 may point to user records stored within an entity table 302.

Figure 5:
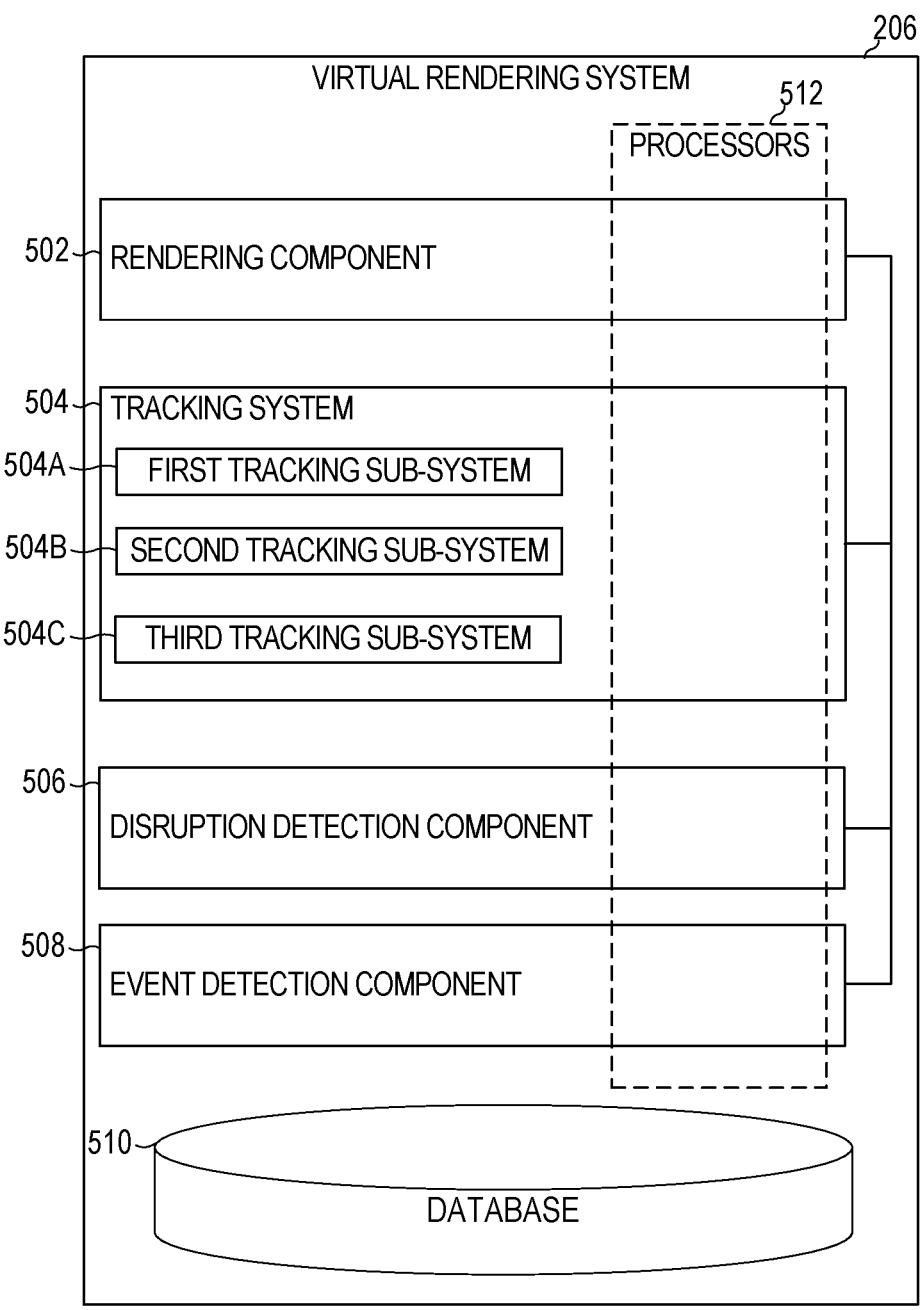
FIG. 5 is a block diagram illustrating various components of a virtual rendering system, according to example embodiments.
Figure 6:
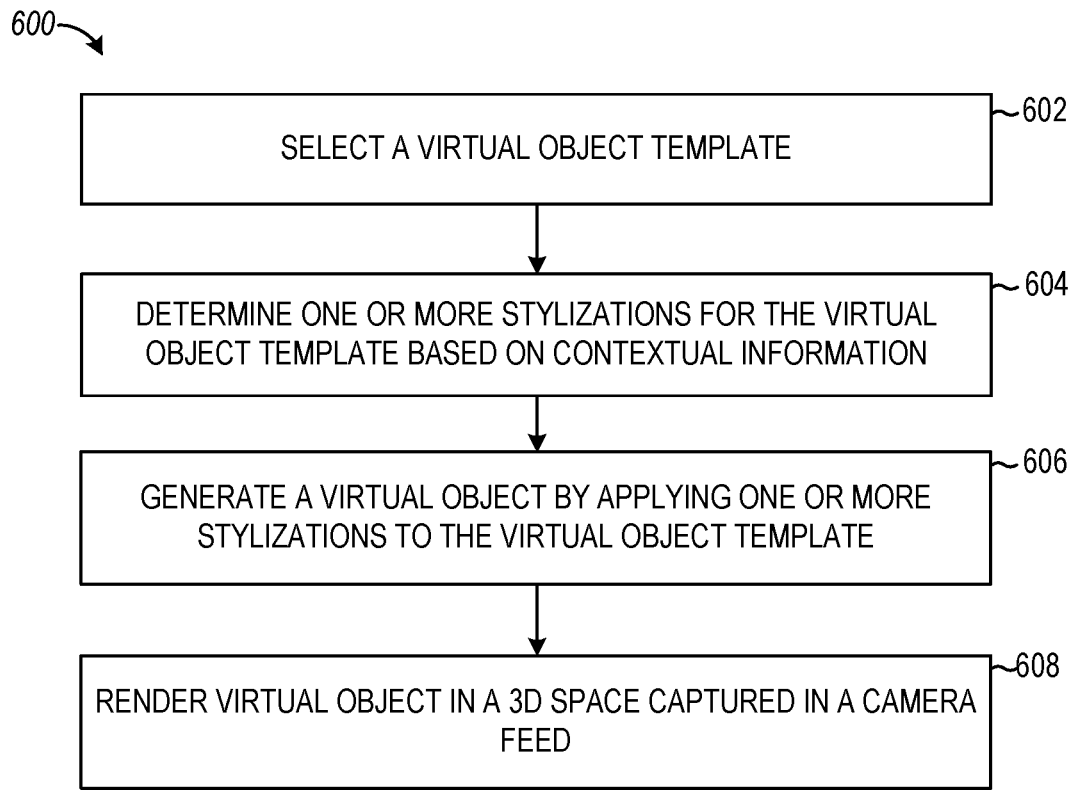
FIGS. 6-10 are flowcharts illustrating example operations of the virtual rendering system in performing a method for rendering a virtual object in a 3D space, according to example embodiments.

FIG. 5 is a block diagram illustrating functional components of the virtual rendering system 206 that configure the virtual rendering system 206 to render virtual objects in a 3D real-world environment depicted in a live camera feed. The virtual rendering system 206 is shown as including a rendering component 502, a tracking system 504, a disruption detection component 506, an event detection component 508, and a database 510. The various components of the virtual rendering system 206 may be configured to communicate with each other (e.g., via a bus, shared memory, or a switch). Although not illustrated in FIG. 5, in some embodiments, the virtual rendering system 206 may include or may be in communication with a camera configured to produce a camera feed comprising image data that includes a sequence of images (e.g., a video).

Any one or more of the components described may be implemented using hardware alone (e.g., one or more of the processors 512 of a machine) or a combination of hardware and software. For example, any component described of the virtual rendering system 206 may physically include an arrangement of one or more of the processors 512 (e.g., a subset of or among the one or more processors of the machine) configured to perform the operations described herein for that component. As another example, any component of the virtual rendering system 206 may include software, hardware, or both, that configure an arrangement of one or more processors 512 (e.g., among the one or more processors of the machine) to perform the operations described herein for that component. Accordingly, different components of the virtual rendering system 206 may include and configure different arrangements of such processors 512 or a single arrangement of such processors 512 at different points in time.

Moreover, any two or more components of the virtual rendering system 206 may be combined into a single component, and the functions described herein for a single component may be subdivided among multiple components. Furthermore, according to various example embodiments, components described herein as being implemented within a single machine, database, or device may be distributed across multiple machines, databases, or devices.

The rendering component 502 is configured to render virtual objects in a 3D space captured within a live camera feed produced by a camera of the client device 110. The rendering component 502 uses a set of rules that specify a manner in which virtual objects are to be rendered based on one or more contextual signals. The manner in which a virtual object is rendered may include one or more stylizations applied to the virtual object and in some embodiments a behavior of the virtual object.

In rendering a virtual object, the rendering component 502 identifies a virtual object template from database 510 and uses the set of rules to determine one or more stylizations to apply to the virtual object template based on one or more context signals. The rendering component 502 generates a virtual object by applying the stylizations to the virtual object template and causes the virtual object to be displayed by a display device of the client device 110.

In some embodiments, the rendering component 502 may further use the set of rules to determine a behavior for the virtual object based on one or more contextual signals. As noted above, the behavior may include one or more movements or actions of the virtual object. Consistent with these embodiments, the rendering component 502 renders the virtual object according to the determined behavior. That is, the rendering component 502 may render an animation of the virtual object performing one or more movements or actions.

The tracking system 504 may comprise a first tracking sub-system 504A, a second tracking sub-system 504B, and a third tracking sub-system 504C. Each tracking sub-system tracks the position of a virtual object to a 3D space based on a set of tracking indicia.

Tracking systems are subject to frequent tracking failure due to environmental conditions, user actions, unanticipated visual interruption between camera and object/scene being tracked, and so forth. Traditionally, such tracking failures would cause a disruption in the presentation of virtual objects in a 3D space. For example, a virtual object may disappear or otherwise behave erratically, thereby interrupting the illusion of the virtual object being presented within the 3D space. This undermines the perceived quality of the 3D experience as a whole.

Traditional tracking systems rely on a single approach (Natural Feature Tracking (NFT), Simultaneous Localization And Mapping (SLAM), Gyroscopic, etc.) that each have breaking points in real-world usage due to inaccurate sensor data, movement, loss or occlusion of visual marker, or dynamic interruptions to a scene. Further, each approach may have individual limitations in capability. For example, a gyroscopic tracking system can only track items with three degrees of freedom (3DoF). Further, utilization of a single tracking system provides inaccurate or unstable position estimation, due to inherent limitations of each individual system. For example, an NFT system may not provide sufficient pitch, yaw, or roll estimation due to the inaccuracies of visual tracking alone, while gyroscopic tracking systems provide inaccurate translation (up, down, left, right).

To address the foregoing issues with traditional tracking systems, the virtual rendering system 206 comprises multiple redundant tracking sub-systems 504A-C that enable seamless transitions between tracking sub-systems. The multiple redundant tracking sub-systems 504A-C address the issues with traditional tracking systems by merging multiple tracking approaches into a single tracking system 504. The tracking system 504 is able to combine 6DoF and 3DoF tracking techniques through combining and transitioning between multiple tracking systems based on the availability of tracking indicia tracked by the tracking systems. Thus, as the indicia tracked by any one tracking system becomes unavailable, the virtual rendering system 206 seamlessly switches between tracking in 6DoF and 3DoF, thereby providing the user with an uninterrupted experience. For example, in the case of visual tracking systems (e.g., NFT, SLAM), tracking indicia typically analyzed to determine orientation may be replaced with gyroscopic tracking indicia from a gyroscopic tracking system. This would thereby enable transitioning between tracking in 6Dof and 3DoF based on the availability of tracking indicia.

In some example embodiments, to transition between tracking in 6DoF and 3DoF, the virtual rendering system 206 gathers and stores tracking indicia within a tracking matrix that includes translation indicia (e.g., up, down, left, right) and rotation indicia (e.g., pitch, yaw, roll). The translation indicia gathered by an NFT system may thereby be extracted from the tracking matrix and utilized when future translation indicia gathered by the NFT system become inaccurate or unavailable. In the meantime, the rotation indicia continue to be provided by the gyroscope. In this way, when the mobile device loses tracking indicia, the tracked objects that are presented in the 3D space will not be changed abruptly at the frame when the tracking indicia are lost. Subsequently, when the target tracking object reappears in the screen, and a new translation $T_1$ is obtained, the translation part of the view matrix will then be taking advantage of the new translation $T_1$ and use $T_1$-$T_0$ as the translation of the view matrix.

The virtual rendering system 206 may track and adjust the position of a virtual object by one or more tracking systems in 6DoF. For example, the one or more tracking systems of the virtual rendering system 206 may collect and analyze a set of tracking indicia (e.g., roll, pitch, yaw, natural features, etc.) in order to track the position of the virtual object relative to the client device 110 in the 3D space with 6DoF.

In such embodiments, the virtual rendering system 206 may transition between tracking systems based on the availability of the tracked indicia to maintain consistent tracking in 6DoF.

The disruption detection component 506 monitors tracking indicia to detect disruptions. Upon the disruption detection component 506 detecting an interruption of one or more indicia, such that tracking in 6DoF becomes unreliable or impossible, the virtual rendering system 206 transitions to tracking the virtual object in the 3D space in 3DoF in order to prevent an interruption of the display. For example, the virtual rendering system 206 may transition from a first tracking system (or first set of tracking systems among the set of tracking systems) to a second tracking system among the set of tracking systems (or second set of tracking systems), wherein the second tracking system is capable of tracking the virtual object with 3DoF in the 3D space, based on the tracking indicia available.

In some example embodiments, the set of tracking systems of the virtual rendering system 206 includes a gyroscopic tracking system, an NFT system, and a SLAM tracking system. Each tracking system among the set of tracking systems may analyze tracking indicia in order to track a position of a virtual object within a 3D space. For example, to track a virtual object with 6DoF, the virtual rendering system 206 may require at least six tracking indicia to be available. As tracking indicia become obstructed or unavailable for various reasons, the virtual rendering system 206 may transition between the available tracking systems among the set of tracking systems in order to maintain 6DoF or transition to 3DoF, if necessary.

It will be readily appreciated that the virtual rendering system 206 provides consistent rendered virtual objects (e.g., visual effects applied to real-world surface) in real-world 3D spaces in a wide variety of environments and situations. In many applications it can be desirable to provide firm consistency for the locations of these virtual objects as one or more users, cameras, or other tracking items move around in the environment. This can involve the recognition and use of a specific fixed reference point (e.g., a fixed surface) in the real-world environment. Not using a fixed reference point or item can result in floating or other undesirable inconsistencies in the rendering and presentation of the virtual objects.

To ensure firm consistency in the location of virtual objects, annotation data in the example form of a presentation lens that is specific for virtual object tracking and rendering described herein may be employed. In particular, a surface aware lens is a presentation lens that identifies and references a real-world surface (e.g., the ground) for the consistent rendering and presentation of virtual objects in 3D space. The surface aware lens can be a specific portion or subcomponent within the rendering component 502. This surface aware lens of the rendering component 502 can be configured to recognize a reference surface based on visual camera content, and may also utilize other device inputs (e.g., gyroscope, accelerometer, compass) to determine what is an appropriate surface within a 3D space depicted in a live camera feed. Once the reference surface has been determined, then virtual objects can be accomplished with respect to that reference surface. In an example, the reference surface in the 3D space is a ground surface. The virtual rendering system 206 may render a virtual object at a position in the 3D space such that the object appears to be anchored to the ground surface.

In some embodiments, the virtual rendering system 206 may render a virtual object to a 3D space depicted in a live camera feed of the client device 110 in response to a triggering event. To this end, the event detection component 508 is responsible for detecting such triggering events. The event detection component 508 may detect a triggering event based on data received from one or more components of the client device 110 or from one or more external sources accessible via the network 104. For example, the triggering event may be based on geolocation data from a location component of the client device 110, and the detecting of the triggering event may include detecting the client device 110 being at or near a particular geographic location. As another example, the triggering event may be based on a temporal factor and the detecting of the triggering event may include detecting a particular date or time based on a clock signal maintained by the client device 110. As yet another example, the triggering event may be based on weather conditions data (e.g., obtained from an external source over the network 104) that describes weather conditions, and the detecting of the triggering event may include detecting a certain weather conditions condition (e.g., snow, rain, wind).

FIGS. 6-10 is are flowchart illustrating a method 600 for rendering a virtual object in a 3D space, according to various embodiments of the present disclosure. The method 600 may be embodied in computer-readable instructions for execution by one or more processors such that the operations of the method 600 may be performed in part or in whole by the functional components of the virtual rendering system 206; accordingly, the method 700 is described below by way of example with reference thereto. However, it shall be appreciated that at least some of the operations of the method 700 may be deployed on various other hardware configurations and the method 700 is not intended to be limited to the virtual rendering system 206.

At operation 602, the virtual rendering system 206 selects a virtual object template for use in generating a virtual object to be rendered within a 3D space captured in a camera feed of a computing device. That is, the virtual object template provides a basis for a virtual object to be rendered. As will be discussed in further detail below, the virtual rendering system 206 may select the virtual object template in response to detecting a triggering event. In some embodiments, the virtual rendering system 206 may select the virtual object template based on user input (e.g., indicative of a selection of a virtual object template from an interface that displays a collection of object templates).

In some embodiments, the virtual rendering system 206 may select the virtual object template based on contextual information describing an environment surrounding the computing device. For example, the virtual rendering system 206 may select the virtual object based on a location of the computing device, temporal factors such as a time of day, a day of the week, or time of year, or weather conditions at the location of the computing device. In some embodiments, the virtual rendering system 206 selects the virtual object template from a database of templates in which templates are stored with an association to contextual information.

As a first example, when the computing device is located in Paris, France, the virtual rendering system 206 may select a virtual object template that is specifically associated with Paris such as a template representing the Eifel Tower. In this example, the virtual rendering system 206 may select the template representing the Eifel Tower based on the template having being specifically associated with Paris in the database.

As a second example, on a Monday, the virtual rendering system 206 may select a virtual object template that is specifically associated with Mondays such as a template comprising a text string that provides a commentary on Mondays (e.g., "I hate Mondays"). In this example, the virtual rendering system 206 may select the template comprising the text string based on the template being specifically associated with Mondays in the database. To further this example, the database may, in addition, specify a virtual object template for other days of the week (e.g., "Humpday" for Wednesdays or "FriYAY!!" for Fridays).

As a third example, during winter, the virtual rendering system 206 may select a virtual object template that is specifically associated with winter such as a template representing a snowman. In this example, the virtual rendering system 206 may select the template representing the snowman based on a specific association between the template and winter in the database.

At operation 604, the virtual rendering system 206 determines one or more stylizations for the virtual object template based on contextual information comprising one or more contextual signals. The virtual rendering system 206 determines the one or more stylizations for the virtual object template based on a set of rules that define a manner of rendering a virtual object based on the one or more contextual signals. A rule in the set of rules may specify one or more stylizations to apply to a virtual object template in response to detecting a particular contextual signal or a particular combination of contextual signals.

The contextual information may, for example, include one or more of: user input data; biometric data; motion data; environmental data; position data; temporal data; event data describing an event; location data describing a location of the computing device; a visual attribute of image data generated by the camera; an object detected image data generated by the camera; an action or gesture detected image data generated by the camera; weather conditions data; audio data produced by a microphone in communication with the computing device; a gaze of a user of the computing device; or an attribute of the virtual object. The one or more stylizations may, for example, include any one or more of: a color; a texture; a size; an object geometry; an opacity; a typography; a typographical emphasis; an adornment; or an additional virtual representation related to the virtual object.

As a first example, the set of rules may include a rule that specifies that a sand-like texture be applied to a virtual object if the virtual rendering system 206 determines the computing device is located a beach. As a second example, the set of rules may include a rule that specifies an icicle-like adornment be added to a virtual object if the virtual rendering system 206 determines that a temperature in the area of the computing device is below a temperature threshold. As a third example, the set of rules may include a rule that specifies a first color be applied to a virtual object when rendered during a first time of day (e.g., red when rendered in the morning) and a second color be applied to the virtual object when rendered during a second time of day (e.g., black when rendered in the evening). As a fourth example, the set of rules may include a rule that specifies that an adornment such as hearts be added to a virtual object comprising the text string "I Love This."

At operation 606, the virtual rendering system 206 generates a virtual object by applying the one or more stylizations to the virtual object template. The applying of the one or more stylizations may include any one or more of: adding or changing a color of one or more aspects of the virtual object; a adding or changing a texture of one or more aspects of the virtual object; adjusting a size of the virtual object template; adjusting an object geometry; adjusting an opacity; changing or setting a typography; adding or removing a typographical emphasis; adding or removing an adornment; or adding an additional virtual representation related to the virtual object template.

Following the more specific examples presented above with respect to operation 604, in the first example, the virtual rendering system 206 may apply a sand-line texture to a text-based virtual object template based on the computing device being located at the beach. In the second example, the virtual rendering system 206 may add an icicle-like adornment to the virtual object template based on the temperature in the area of the computing device being below a threshold temperature. In the third example, the virtual rendering system 206 applies a first color to the virtual object when rendering during the first time of day and applies a second color to the virtual object when rendering during the second time of day. In the fourth example, the virtual rendering system 206 applies hearts as an adornment to the text string "I Love This."

At operation 608, the virtual rendering system 206 renders the virtual object in the 3D space captured in the camera feed in accordance with the one or more stylizations. That is, the virtual rendering system 206 renders a virtual object that is based on the virtual object template with one or more stylizations applied thereto. The camera feed comprises image data that includes a sequence of images (e.g., video) in which the 3D space is depicted.

Following the more specific examples presented above with respect to operation 604 and 606, in the first example, the virtual rendering system 206 renders a text-based virtual object with a sand-like texture. In the second example, the virtual rendering system 206 renders a virtual object with an icicle-like adornment. In the third example, the virtual rendering system 206 renders the virtual object in the first color during the first time of day and renders the virtual object in the second color during the second time of day.

Figure 7:
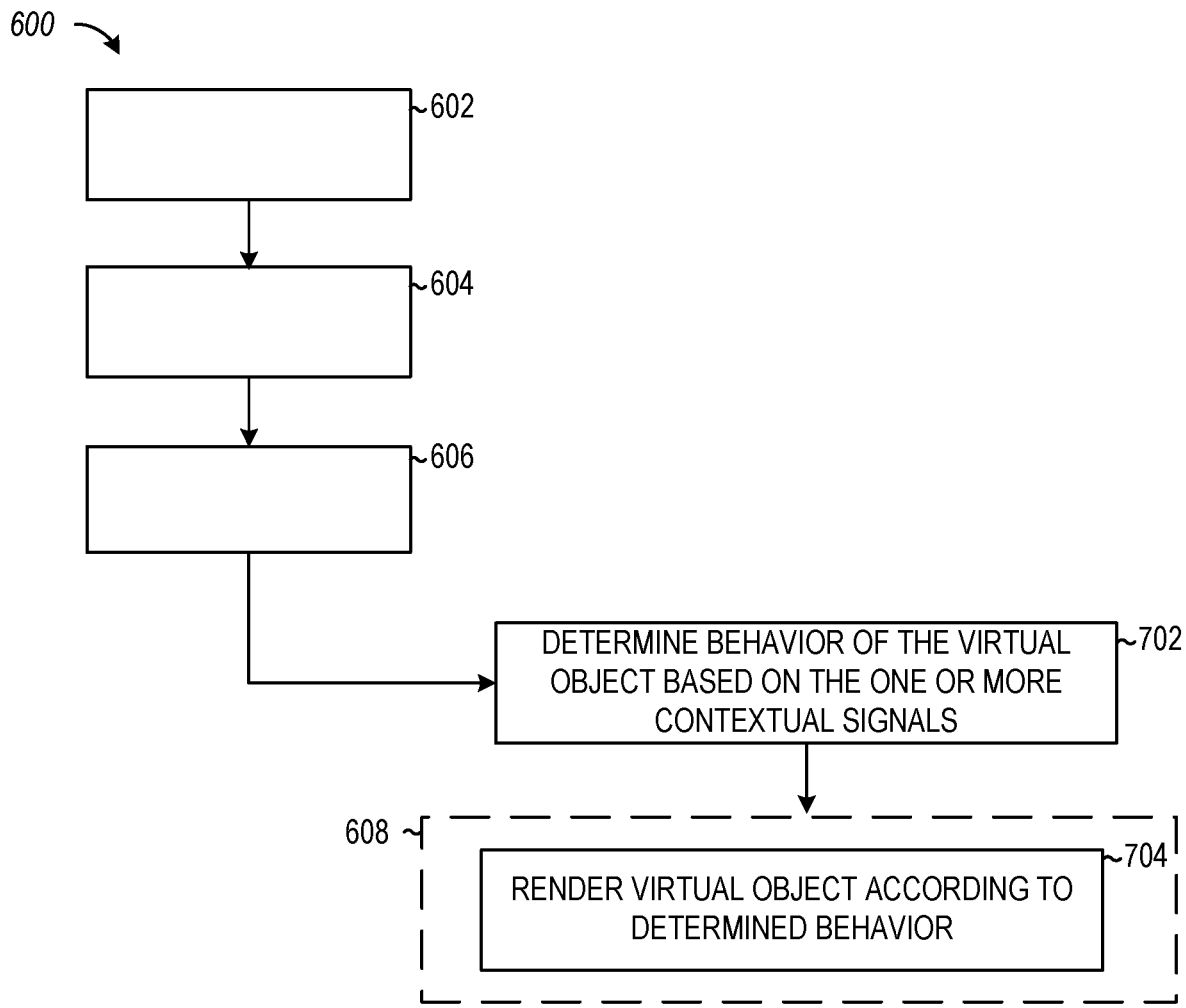

As shown in FIG. 7, the method 600 may, in some embodiments, comprise operations 702 and 704. Consistent with some embodiments, the operation 702 may be performed prior to operation 606 where the virtual rendering system 206 renders the virtual object. At operation 702, the virtual rendering system 206 determines a behavior of the virtual object based on the contextual information. The virtual rendering system 206 determines the behavior of the virtual object based on the set of rules that define the manner of rendering a virtual object based on the one or more contextual signals. A rule in the set of rules may specify a behavior associated with a virtual object based on a particular contextual signal or a particular combination of contextual signals.

The behavior of the virtual object may correspond to an animated movement or action of the virtual object. That is, the behavior may comprise one or more movements of or actions performed by one or more aspects of the virtual object. In an example, the virtual object is a cat, and the virtual rendering systems 206 may determine the behavior of the virtual object include squinting eyes based on the contextual information indicating that it is sunny in the area of the computing device.

The determined behavior may be one of multiple general behaviors that can be applied to virtual objects, or the determined behavior may correspond to a behavior that is specific to the virtual object template. That is, a virtual object template may have one or more associated behaviors that may be applied to a virtual object generated based thereon but not to virtual objects generated based on other templates. For example, in the example above in which the virtual object is a cat, squinting eyes is an available behavior; however, such a behavior would be inapplicable and thus unavailable to a text-based virtual object. A virtual object template may specify which behaviors can be applied to virtual objects generated based thereon.

Consistent with some embodiments, the operation 704 may be performed as part of operation 608 where the virtual rendering system 206 renders the virtual object in accordance with the determined behavior. The rendering of the virtual object in accordance with the determined behavior may include rendering an animation of the virtual object or one or more aspects of the virtual object performing one or more movements or actions. Following the example of the cat from above, the virtual rendering system 206 may render the cat squinting his eyes in a sunny 3D space captured within the camera feed of the computing device.

Figure 8:
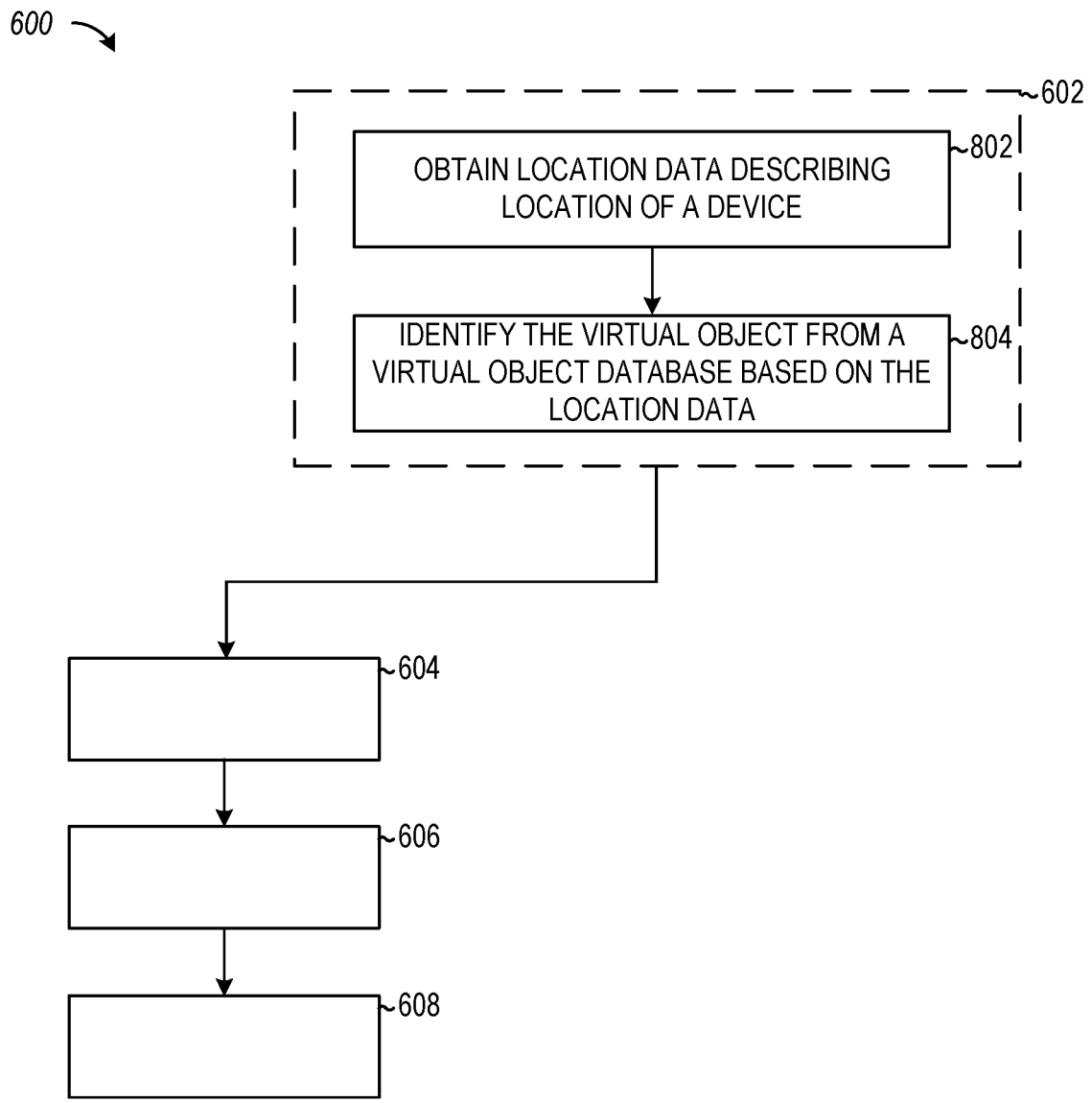

As shown in FIG. 8, the method 600 may, in some embodiments, include operations 802 and 804. Consistent with some embodiments, the operations 802 and 804 may be performed as part of operation 602 where the virtual rendering system 206 selects the virtual object for rendering. At operation 802, the virtual rendering system 206 obtains location data describing a location of the computing device on which the virtual object is to be rendered. In some embodiments, the location data may comprise coordinates (e.g., a latitude and longitude) or other information describing a geographic location of the computing device. In some embodiments, the location data may be based on an analysis of image data produced by the camera of the computing device. In other words, image data produced by the camera of the computing device may be analyzed by the virtual rendering system 206 to determine a location of the computing device as part of a process of generating the location data.

At operation 804, the virtual rendering system 206 identifies the virtual object template from a database using the location data. For example, as noted above, the database includes associations between locations and the virtual object template. That is, the database specifies a virtual object template specifically associated with the location of the virtual rendering system 206. The database may be indexed by location, and thus, the virtual rendering system 206 may perform a lookup on the database using the location of the computing device to identify the virtual object associated with the location of the computing device.

In some embodiments, the substance of the virtual object template relates to the location of the computing device. In some instances, the virtual object template comprises a text string related to the location of the computing device. For example, the virtual rendering system 206 may identify a virtual object template comprising the text string "Paris, France" based on the location data indicating that the current location of the computing device is Paris, France. As another example, the virtual rendering system 206 may identify a virtual object template comprising the text string "Mission St. & 16$^{th}$ St." based on the location data indicating that the current location of the computing device is at the corner of Mission St. and 16$^{th}$ St.

It shall be appreciated that although FIG. 8 provides an example in which the virtual object template is identified based on a location of the computing device, the basis for identifying the virtual object template is not limited to the location of the virtual object template and in other embodiments, other contextual signals may be used to identify the virtual object template. Further, the associations in the database from which the virtual object template is identified, are not limited to locations and in other embodiments, other contextual signals may be associated with virtual object templates.

Figure 9:
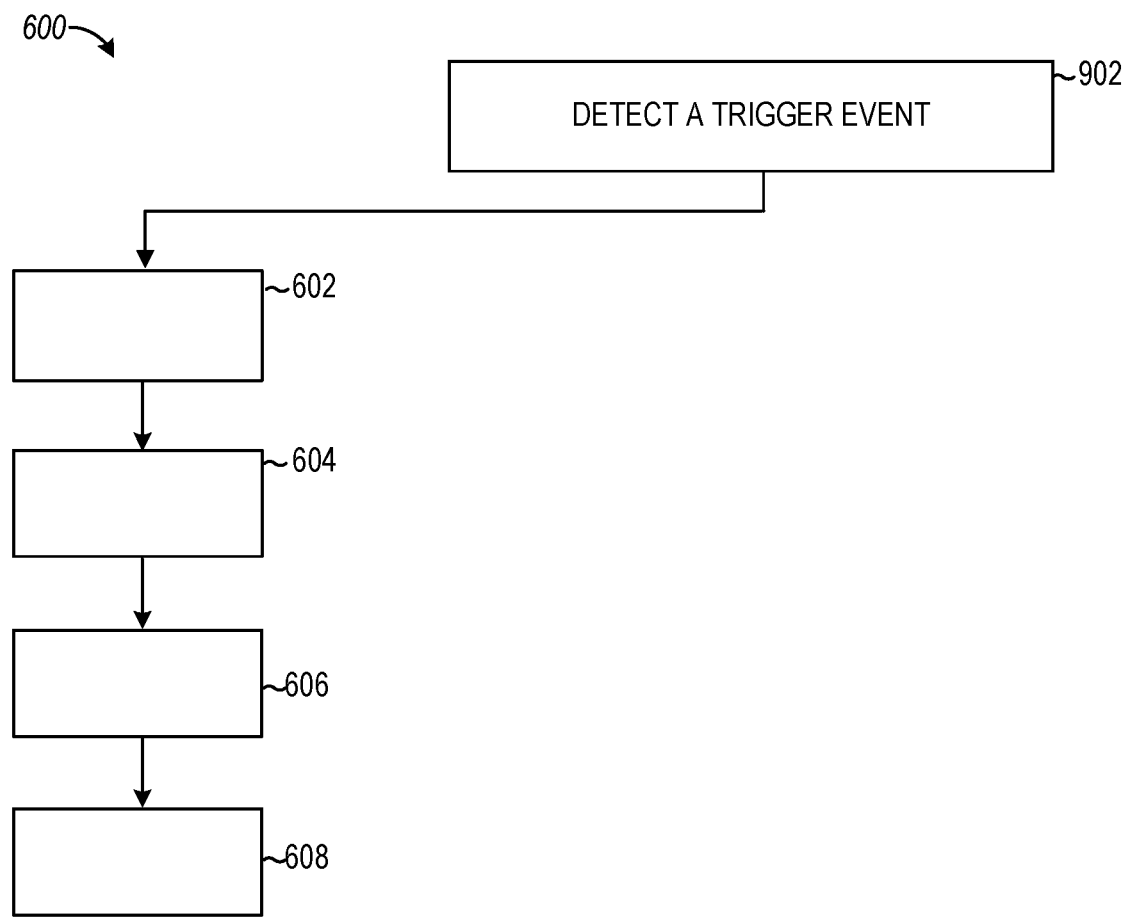

As shown in FIG. 9, the method 600 may, in some embodiments, include operation 902. Consistent with some embodiments, the operation 902 may be performed as part of the operation 602, where the virtual rendering system 206 selects the virtual object template.

At operation 902, the virtual rendering system 206 detects a triggering event. The triggering event may, for example, be detected based on location data (e.g., from a location component of the computing device) describing a location of the computing device. As an example, the detecting of the triggering event may include detecting when the computing device is at or within a predefined distance of a particular location. As another example, the triggering event may be detected based on temporal factors and thus, the detecting the triggering event may include detecting a particular date or time. As yet another example, the triggering event may be detecting based on weather conditions, and thus, the detecting of the triggering event may include detecting certain weather conditions condition (e.g., snow, rain, wind).

In some embodiments, a triggering event may correspond to user input and detecting the triggering event may include detecting particular user input received from an input/output component of the computing device. As an example, the computing device may execute a client application that provides function to render virtual objects. The virtual rendering system 206 may receive input to activate virtual object rendering functions. This input can be in the form of a manual user input, which can be, for example, a button tap or holding or pointing an active camera in such a manner so as to indicate selection of the functionality. Consistent with this example, the detecting of the triggering event may include receiving user input to activate virtual object rendering functionality.

Consistent with these embodiments, detecting a triggering event may include detecting a user providing input. For example, the virtual rendering system 206 may detect a user typing "Love" and in response, the virtual rendering system 206 may select a heart for rendering.

Figure 10:
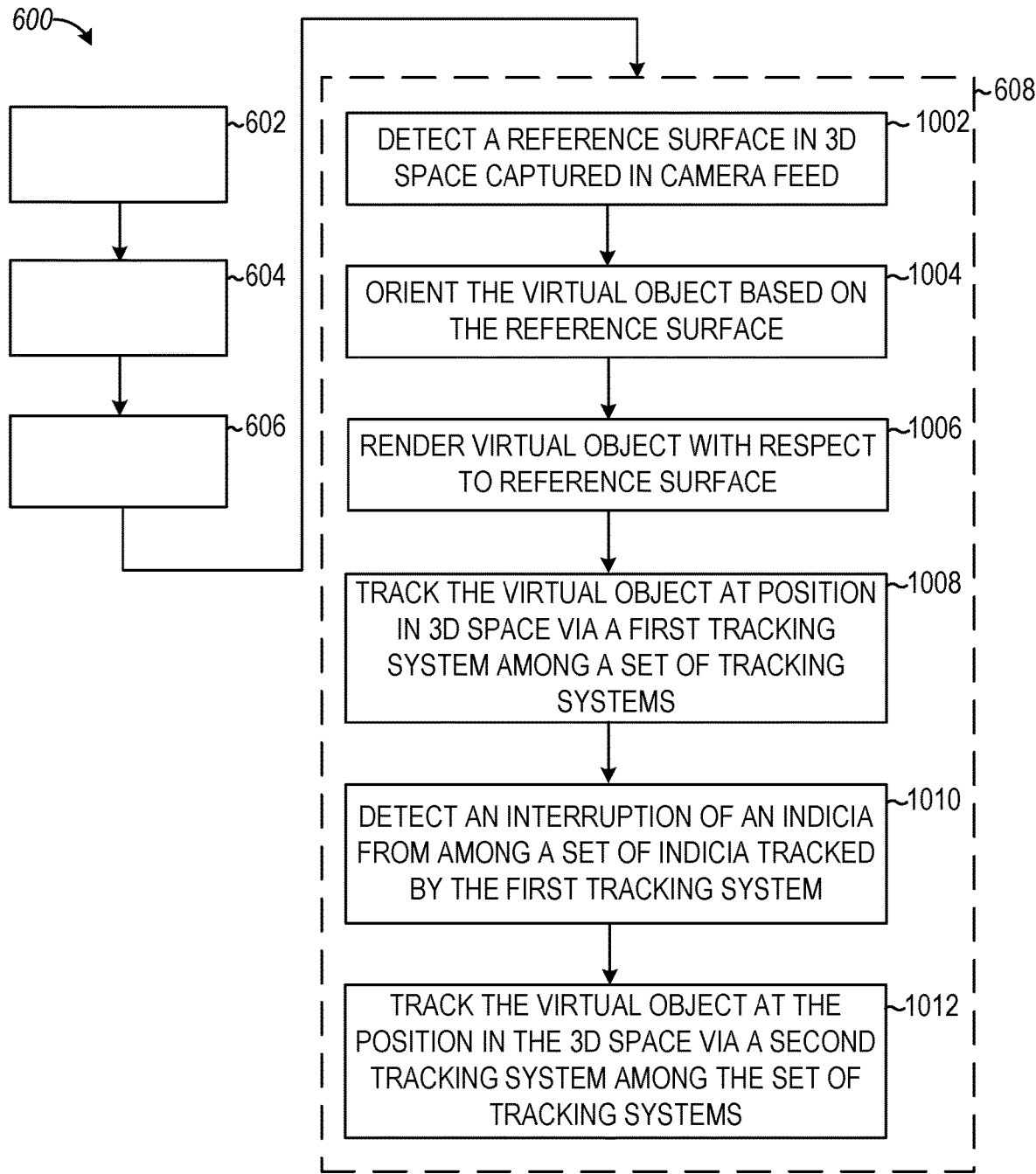

As shown in FIG. 10, the method 600 may, in some embodiments, include operations 1002, 1004, 1006, 1008, 1010, and 1012. Consistent with these embodiments, the operations 1002, 1004, 1006, 1008, 1010, and 1012 may be performed as part of (e.g., a sub-routine or sub-tasks) operation 608 where the rendering system 206 renders the virtual object.

At operation 1002, the rendering component 602 detects a real-world reference surface in 3D space depicted in the camera feed. The reference surface may be the ground surface, although any other fixed and ascertainable surfaces may also be used. For example, the rendering component 602 may detect the reference surface by identifying a fixed surface based on an analysis of visual camera content, and may also utilize other device inputs (e.g., gyroscope, accelerometer, compass) to ascertain what is an appropriate surface within the 3D space depicted in the camera feed.

In some embodiments, the detecting of the reference surface may be based on user input received on a presentation of the camera feed. This input can be in the form of a manual user input, which can be, for example, a button tap or holding or pointing an active camera in such a manner so as to indicate that a surface is being referenced. In other embodiments, which will be discussed below in reference to FIG. 10, the detecting of the reference surface may be in response to detecting a triggering event associated with the reference surface.

In various embodiments, a confirmation that the proper reference surface has been indicated or highlighted can be requested from the user. In some situations, the system may indicate that a proper reference surface cannot be detected, such that further input or help from the user may be needed.

At operation 1004, the rendering component 602 orients the virtual object based on the detected reference surface. The orienting of the virtual object may include assigning the virtual object to a position in 3D space based on the detected reference surface and identifying a set of tracking indicia to be used by the tracking system 604 in tracking the virtual object in the 3D space. The position to which the virtual object is assigned may correspond to the reference surface or a predefined distance above the reference surface.

At operation 1006, the rendering component 602 renders the virtual object with respect to the reference surface. More specifically, the rendering of the virtual object with respect to the reference surface may include rendering and maintaining the virtual object at the assigned position within the 3D space. Thus, in instances in which the assigned position is a predefined distance from the reference surface, the rendering of the virtual object may include rendering and maintaining the virtual object at the predefined distance from the reference surface. In these instances, the virtual object, when rendered, may not actually appear to contact or rest against the reference surface, but rather may appear to be hovering above or extending away from the reference surface at the predefined distance.

At operation 1008, the tracking system 604 tracks the virtual object in 6DoF at the position in the 3D space via the first tracking sub-system 604A, or a combination of multiple tracking sub-systems (e.g., the first tracking sub-system 604A and the second tracking sub-system 604B), based on the identified set of tracking indicia. When tracking the virtual object in 6DoF, a user viewing the object on the client device 110 can turn or move in any direction without disrupting tracking of the object. For example, the tracking system 604 may track the position of the virtual object based on a combination of an NFT system and a gyroscopic tracking system.

At operation 1010, the disruption detection component 606 detects an interruption of a tracking indicium from among the tracking indicia tracked by the tracking sub-systems (e.g., the first tracking sub-system 604A). For example, the first tracking sub-system 604A may include an NFT system configured to rely on tracking indicia that include features of an environment or active light sources in proximity to the virtual object within the environment (e.g., the ground's plane, or the horizon). The NFT system of the first tracking sub-system 604A may therefore rely on the positions of three or more known features in the environment to determine the position of the virtual object relative to the client device 110 in the three-dimensional space. Should any one or more of the tracking indicia tracked by the first tracking sub-system 604A become obstructed or unavailable, the tracking of the virtual object in the 3D space would become disrupted.

At operation 1012, in response to the disruption detection component 606 detecting the disruption of the one or more tracking indicia, the tracking system 604 transitions to one or more other tracking sub-systems (e.g., the second tracking sub-system 604B and/or the third tracking sub-system 604C) to maintain tracking of the virtual object relative to the client device 110 in the 3D space. In doing so, the tracking system 604 may transition from 6DoF to 3DoF, wherein 3DoF measures pitch, roll, and yaw, but does not measure translations. As the tracking indicia again become available, the tracking system 604 may transition from 3DoF back to 6DoF. For example, when the NFT system becomes unavailable, the tracking system 604 may utilize the last tracking indicia gathered and tracked by the NFT system throughout the subsequent 3DoF experience.

Figure 11:
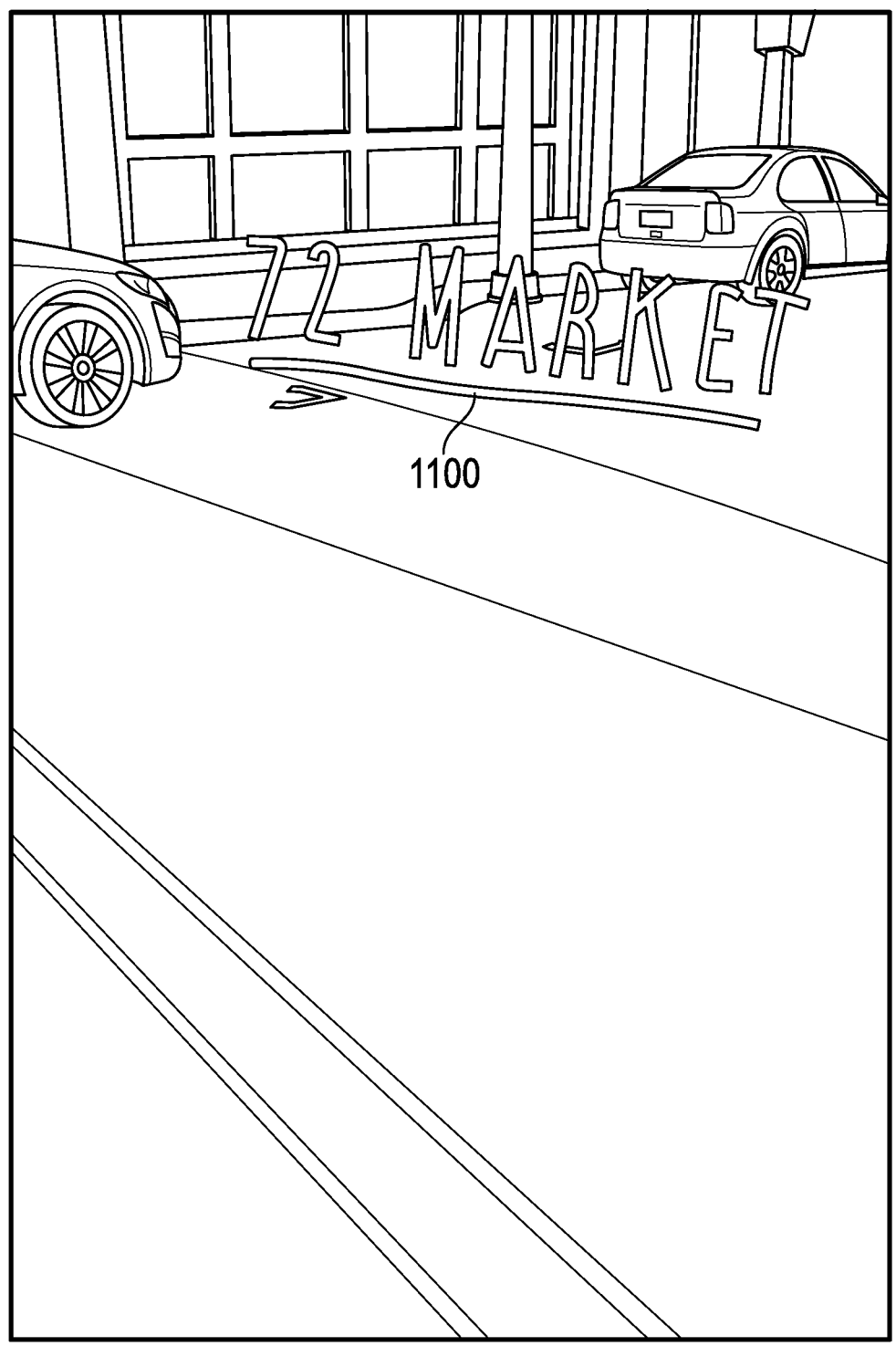
FIG. 11 is an interface diagram illustrating a virtual object rendered by the virtual rendering system based on contextual information, according to some example embodiments.

FIG. 11 is an interface diagram illustrating a virtual object 1100 rendered by the virtual rendering system 206 based on contextual information, according to some example embodiments. As shown, the virtual object 1100 is a text string ("72 Market") selected based on and rendered in response to input data from a location component of a computing device. The virtual object 1100 is rendered within a real-world urban environment depicted within a camera feed of the computing device within respect to a road surface. As shown, a rendering stylization comprising a particular typography applied to the text string as part of the rendered virtual object 1100 based at least in part on the location of the computing device (as determined by the location data). That is, the text string and stylization forming the virtual object 1100 is particular to the current location of the computing device and a different text string with a different stylization may be rendered at a different location.

Figure 12:
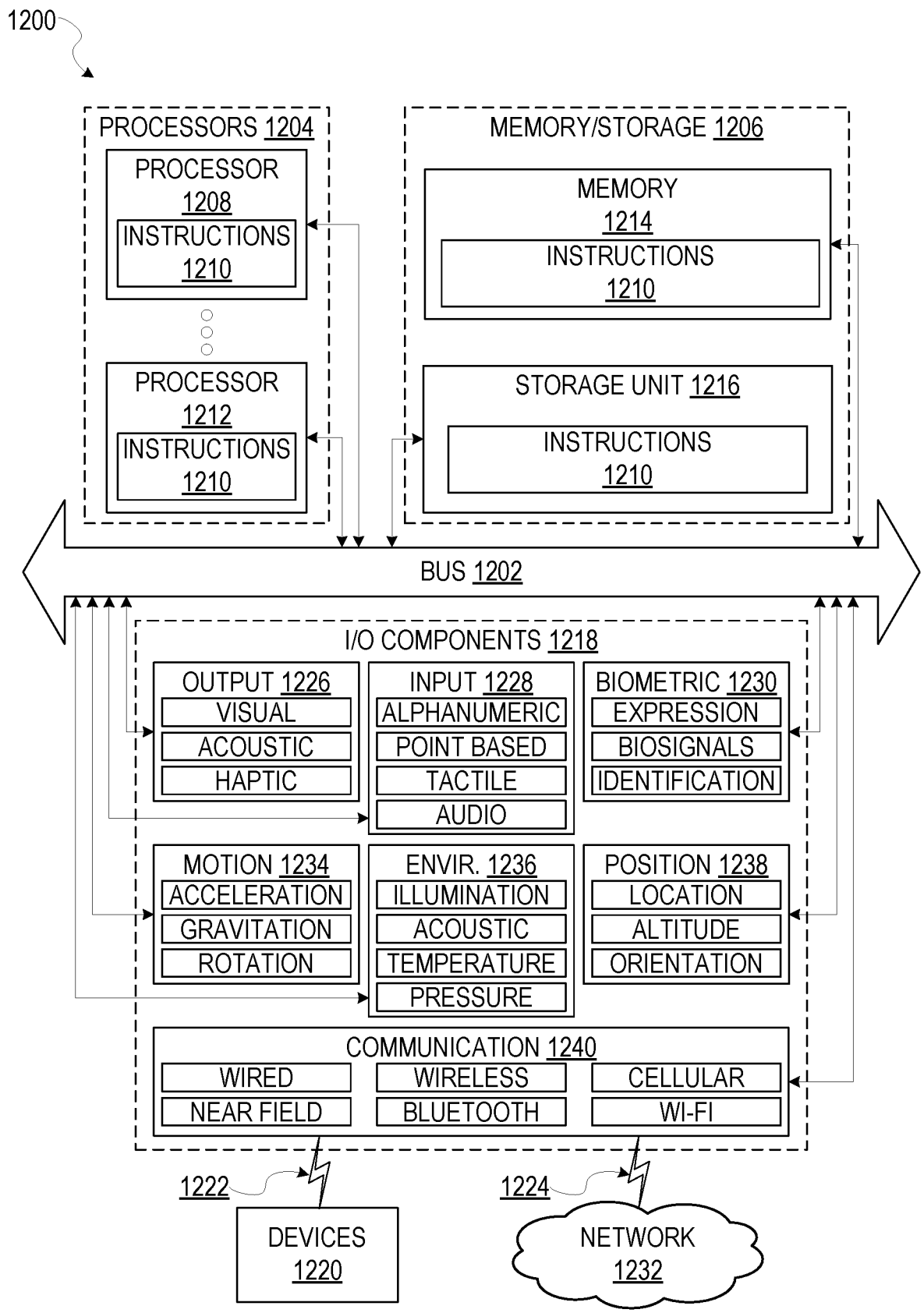
FIG. 12 is a block diagram illustrating components of a machine able to read instructions from a machine-readable medium (e.g., a machine-readable storage medium) and perform any one or more of the methodologies discussed herein, according to example embodiments.

FIG. 12 is a block diagram illustrating components of a machine 1200, according to some example embodiments, able to read instructions from a machine-readable medium (e.g., a machine-readable storage medium) and perform any one or more of the methodologies discussed herein. Specifically, FIG. 12 shows a diagrammatic representation of the machine 1200 in the example form of a computer system, within which instructions 1210 (e.g., software, a program, an application, an applet, an app, or other executable code) for causing the machine 1200 to perform any one or more of the methodologies discussed herein may be executed. As such, the instructions 1210 may be used to implement modules or components described herein. The instructions 1210 transform the general, non-programmed machine 1200 into a particular machine 1200 programmed to carry out the described and illustrated functions in the manner described. In alternative embodiments, the machine 1200 operates as a standalone device or may be coupled (e.g., networked) to other machines. In a networked deployment, the machine 1200 may operate in the capacity of a server machine or a client machine in a server-client network environment, or as a peer machine in a peer-to-peer (or distributed) network environment. The machine 1200 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1210, sequentially or otherwise, that specify actions to be taken by machine 1200. Further, while only a single machine 1200 is illustrated, the term "machine" shall also be taken to include a collection of machines that individually or jointly execute the instructions 1210 to perform any one or more of the methodologies discussed herein.

The machine 1200 may include processors 1204, memory memory/storage 1206, and I/O components 1218, which may be configured to communicate with each other such as via a bus 1202. In an example embodiment, the processors

1204 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 1208 and a processor 1212 that may execute the instructions 1210. The term "processor" is intended to include multi-core processors 1204 that may comprise two or more independent processors (sometimes referred to as "cores") that may execute instructions contemporaneously. Although FIG. 12 shows multiple processors, the machine 1200 may include a single processor with a single core, a single processor with multiple cores (e.g., a multi-core processor), multiple processors with a single core, multiple processors with multiple cores, or any combination thereof.

The memory/storage 1206 may include a memory 1214, such as a main memory, or other memory storage, and a storage unit 1216, both accessible to the processors 1204 such as via the bus 1202. The storage unit 1216 and memory 1214 store the instructions 1210 embodying any one or more of the methodologies or functions described herein. The instructions 1210 may also reside, completely or partially, within the memory 1214, within the storage unit 1216, within at least one of the processors 1204 (e.g., within the processor's cache memory), or any suitable combination thereof, during execution thereof by the machine 1200. Accordingly, the memory 1214, the storage unit 1216, and the memory of processors 1204 are examples of machine-readable media.

The I/O components 1218 may include a wide variety of components to receive input, provide output, produce output, transmit information, exchange information, capture measurements, and so on. The specific I/O components 1218 that are included in a particular machine 1200 will depend on the type of machine. For example, portable machines such as mobile phones will likely include a touch input device or other such input mechanisms, while a headless server machine will likely not include such a touch input device. It will be appreciated that the I/O components 1218 may include many other components that are not shown in FIG. 12. The I/O components 1218 are grouped according to functionality merely for simplifying the following discussion and the grouping is in no way limiting. In various example embodiments, the I/O components 1218 may include output components 1226 and input components 1228. The output components 1226 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1228 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 1218 may include biometric components 1230, motion components 1234, environmental components 1236, or position components 1238 among a wide array of other components. For example, the biometric components 1230 may include components to detect expressions (e.g., hand expressions, facial expressions, vocal expressions, body gestures, or eye tracking), measure bio signals (e.g., blood pressure, heart rate, body temperature, perspiration, or brain waves), identify a person (e.g., voice identification, retinal identification, facial identification, fingerprint identification, or electroencephalogram based identification), and the like. The motion components 1234 may include acceleration sensor components (e.g., accelerometer), gravitation sensor components, rotation sensor components (e.g., gyroscope), and so forth. The environment components 1236 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1238 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1218 may include communication components 1240 operable to couple the machine 1200 to a network 1232 or devices 1220 via coupling 1224 and coupling 1222, respectively. For example, the communication components 1240 may include a network interface component or other suitable device to interface with the network 1232. In further examples, communication components 1240 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1220 may be another machine or any of a wide variety of peripheral devices (e.g., a peripheral device coupled via a USB).

Moreover, the communication components 1240 may detect identifiers or include components operable to detect identifiers. For example, the communication components 1240 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1240, such as, location via Internet Protocol (IP) geo-location, location via Wi-Fi® signal triangulation, location via detecting a NFC beacon signal that may indicate a particular location, and so forth.

Glossary

"CARRIER SIGNAL" in this context refers to any intangible medium that is capable of storing, encoding, or carrying instructions for execution by the machine, and includes digital or analog communications signals or other intangible medium to facilitate communication of such instructions. Instructions may be transmitted or received over the network using a transmission medium via a network interface device and using any one of a number of well-known transfer protocols.

"CLIENT DEVICE" in this context refers to any machine that interfaces to a communications network to obtain resources from one or more server systems or other client devices. A client device may be, but is not limited to, a mobile phone, desktop computer, laptop, PDAs, smart phones, tablets, ultra books, netbooks, laptops, multi-processor systems, microprocessor-based or programmable consumer electronics, game consoles, set-top boxes, or any other communication device that a user may use to access a network.

"COMMUNICATIONS NETWORK" in this context refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"EMPHEMERAL MESSAGE" in this context refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"MACHINE-READABLE MEDIUM" in this context refers to a component, device or other tangible media able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a Field-Programmable Gate Array (FPGA) or an ASIC. A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain operations may be distributed among the processors, not only residing within a single machine, but also deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"PROCESSOR" in this context refers to any circuit or virtual circuit (a physical circuit emulated by logic executing on an actual processor) that manipulates data values according to control signals (e.g., "commands", "op codes", "machine code", etc.) and which produces corresponding output signals that are applied to operate a machine. A processor may, for example, be a CPU, a RISC processor, a CISC processor, a GPU, a DSP, an ASIC, a RFIC), or any combination thereof. A processor may further be a multi-core processor having two or more independent processors (sometimes referred to as "cores") that may execute instructions contemporaneously.

"TIMESTAMP" in this context refers to a sequence of characters or encoded information identifying when a certain event occurred, for example giving date and time of day, sometimes accurate to a small fraction of a second.

What is claimed is:

1. A system, comprising:
   a memory; and
   at least one hardware processor coupled to the memory and comprising a virtual rendering system, the virtual rendering system causing the system to perform operations comprising:
   selecting a virtual object template operable to generate a virtual object, the virtual object template being associated with multiple behaviors, each behavior of the multiple behaviors corresponding to one or more movements or actions that are performable by the virtual object generated based on the virtual object template;
   determining one or more stylizations for the virtual object template based on contextual information associated with a computing device;
   applying the one or more stylizations to the virtual object template to generate the virtual object;
   selecting, using a set of rules, a behavior for the virtual object, from among the multiple behaviors associated with the virtual object template, based on the contextual information; and
   rendering the virtual object within a 3D space captured within a camera feed of the computing device, the virtual object including the one or more stylizations, the rendering of the virtual object comprising rendering the virtual object performing a movement or action based on the behavior selected from among the multiple behaviors associated with the virtual object template.

2. The system of claim 1, wherein the set of rules specify a manner the virtual object is to be rendered based on one or more contextual signals in the contextual information.

3. The system of claim 1, wherein the operations further comprise:
   detecting a triggering event based on the contextual information;
   wherein the selecting of the virtual object template is in response to detecting the triggering event.

4. The system of claim 3, wherein the virtual object comprises content related to the triggering event.

5. The system of claim 1, wherein the selecting of the virtual object comprises:
   obtaining location data from the computing device, the location data describing a location of the computing device;
   wherein the selecting of the virtual object template is based on the location data.

6. The system of claim 5, wherein the selecting of the virtual object template further comprises:
   identifying the virtual object template from a database using the location data.

7. The system of claim 5, wherein the virtual object template comprises a text string related to the location of the computing device.

8. The system of claim 1, wherein the contextual information includes one or more of: user input data; biometric data; motion data; environmental data; position data; temporal data; event data describing an event; location data describing a location of the computing device; a visual attribute of image data generated by the camera; an object detected image data generated by the camera; an action or gesture detected image data generated by the camera; weather conditions data; audio data produced by a microphone in communication with the computing device; a gaze of a user of the computing device; or an attribute of the virtual object.

9. The system of claim 1, wherein the one or more stylizations comprise one or more of: a color; a texture; a size; an object geometry; an opacity; a typography; a typographical emphasis; an adornment; or an additional virtual representation related to the virtual object template.

10. The system of claim 1, wherein the rendering the virtual object within the 3D space comprises:
detecting a reference surface in the 3D space captured within the camera feed; and
orienting the virtual object at a position in the 3D space based on the detected reference surface.

11. The system of claim 10, wherein orienting the virtual object at the position in the 3D space comprises:
assigning the virtual object to the position in the 3D space based on the detected reference surface; and
identifying tracking indicia operable to track the virtual object in the 3D space.

12. The system of claim 11, wherein the operations further comprise:
tracking, by a first tracking subsystem from among a set of tracking subsystems, the virtual object at the position in the 3D space using the tracking indicia;
detecting an interruption of the tracking indicia; and
in response to detecting the interruption of the tracking indicia, tracking the virtual object at the position in the 3D space via a second tracking subsystem from among the set of tracking subsystems.

13. A method comprising:
selecting, by one or more processors of a machine, a virtual object template operable to generate a virtual object, the virtual object template being associated with multiple behaviors, each behavior of the multiple behaviors corresponding to one or more movements or actions that are performable by the virtual object generated based on the virtual object template;
determining, by the one or more processors of a machine, one or more stylizations for the virtual object template based on contextual information associated with a computing device;
generating, by the one or more processors of a machine, a virtual object by applying the one or more stylizations to the virtual object template;
selecting, using a set of rules, a behavior for the virtual object, from among the multiple behaviors associated with the virtual object template, based on the contextual information; and
rendering the virtual object within a 3D space captured within a camera feed of the computing device, the virtual object including the one or more stylizations, the rendering of the virtual object comprising rendering the virtual object performing a movement or action based on the behavior selected from among the multiple behaviors associated with the virtual object template.

14. The method of claim 13,
wherein the set of rules specify a manner the virtual object is to be rendered based on one or more contextual signals in the contextual information.

15. The method of claim 13, further comprising:
detecting a triggering event based on the contextual information;
wherein the selecting of the virtual object template is in response to detecting the triggering event.

16. The method of claim 13, wherein the selecting of the virtual object comprises:
obtaining location data from the computing device, the location data describing a location of the computing device; and
identifying the virtual object template from a database using the location data.

17. The method of claim 13, wherein the contextual information includes one or more of: user input data; biometric data; motion data; environmental data; position data; temporal data; event data describing an event; location data describing a location of the computing device; a visual attribute of image data generated by the camera; an object detected image data generated by the camera; an action or gesture detected image data generated by the camera; weather conditions data; audio data produced by a microphone in communication with the computing device; a gaze of a user of the computing device; or an attribute of the virtual object.

18. The method of claim 13, wherein the one or more stylizations comprise one or more of: a color; a texture; a size; an object geometry; an opacity; a typography; a typographical emphasis; an adornment; or an additional virtual representation related to the virtual object template.

19. A non-transitory machine-readable storage medium including a virtual rendering system that includes instructions that, when executed by one or more processors of a machine, cause the machine to perform operations comprising:
selecting a virtual object template operable to generate a virtual object, the virtual object template being associated with multiple behaviors, each behavior of the multiple behaviors corresponding to one or more movements or actions that are performable by the virtual object generated based on the virtual object template;
determining one or more stylizations for the virtual object template based on contextual information associated with a computing device;
generating a virtual object by applying the one or more stylizations to the virtual object template;
selecting, using a set of rules, a behavior for the virtual object, from among the multiple behaviors associated with the virtual object template, based on the contextual information; and
rendering the virtual object within a 3D space captured within a camera feed of the computing device, the virtual object including the one or more stylizations, the rendering of the virtual object comprising rendering the virtual object performing a movement or action based on the determined behavior selected from among the multiple behaviors associated with the virtual object template.

20. The non-transitory machine-readable storage medium of claim 19, wherein the set of rules specify a manner the virtual object is to be rendered based on one or more contextual signals in the contextual information.

* * * * *

UNITED STATES PATENT AND TRADEMARK OFFICE
CERTIFICATE OF CORRECTION

PATENT NO. : 11,232,646 B2
APPLICATION NO. : 16/747318
DATED : January 25, 2022
INVENTOR(S) : Goodrich et al.

It is certified that error appears in the above-identified patent and that said Letters Patent is hereby corrected as shown below:

In the Claims

In Column 26, Line 58, in Claim 19, after "the", delete "determined"

Signed and Sealed this
Twenty-fourth Day of May, 2022

Katherine Kelly Vidal
*Director of the United States Patent and Trademark Office*